(12) United States Patent
Kaneda

(10) Patent No.: US 8,140,754 B2
(45) Date of Patent: Mar. 20, 2012

(54) METHODS AND APPARATUS FOR MANAGING HDD'S SPIN-DOWN AND SPIN-UP IN TIERED STORAGE SYSTEMS

(75) Inventor: Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 1070 days.

(21) Appl. No.: 11/969,205

(22) Filed: Jan. 3, 2008

(65) Prior Publication Data
US 2009/0177837 A1 Jul. 9, 2009

(51) Int. Cl.
*G06F 12/00* (2006.01)
*G06F 13/00* (2006.01)
*G06F 13/28* (2006.01)

(52) U.S. Cl. ............ 711/117; 711/4; 711/156; 713/320

(58) Field of Classification Search .................. 711/117
See application file for complete search history.

(56) References Cited

U.S. PATENT DOCUMENTS

| | | | |
|---|---|---|---|
| 7,353,406 B2 | 4/2008 | Yagisawa | |
| 7,360,037 B2 | 4/2008 | Higaki et al. | |
| 7,444,483 B2 | 10/2008 | Taguchi et al. | |
| 7,516,348 B1 * | 4/2009 | Ofer | 713/324 |
| 7,639,493 B2 | 12/2009 | Hori et al. | |
| 7,680,981 B2 | 3/2010 | Yamamoto et al. | |
| 2002/0144057 A1 | 10/2002 | Li et al. | |
| 2004/0243761 A1 * | 12/2004 | Bohrer et al. | 711/114 |
| 2006/0075190 A1 * | 4/2006 | Higaki et al. | 711/114 |
| 2007/0079088 A1 | 4/2007 | Deguchi | |
| 2007/0091497 A1 * | 4/2007 | Mizuno et al. | 360/51 |
| 2007/0143559 A1 | 6/2007 | Yagawa | |
| 2007/0208921 A1 | 9/2007 | Hosouchi | |
| 2007/0294552 A1 * | 12/2007 | Kakihara et al. | 713/320 |

FOREIGN PATENT DOCUMENTS

| | | |
|---|---|---|
| EP | 1643353 A2 | 4/2006 |
| EP | 1785832 A2 | 5/2007 |
| EP | 1808758 A2 | 7/2007 |

(Continued)

OTHER PUBLICATIONS

International Search Report dated Nov. 3, 2010 for corresponding European patent application No. 08018001.1-1245 / 2077495.

*Primary Examiner* — Brian Peugh
*Assistant Examiner* — Prasith Thammavong
(74) *Attorney, Agent, or Firm* — Sughrue Mion, PLLC

(57) ABSTRACT

A storage system is configured as tiered storage (composed of top tier storage apparatuses and second tier storage apparatus at least). The top tire storage apparatus gathers the volume-to-volume map information and power boundary information from second tier storage apparatuses, which are connected to the top tier storage apparatus. The top tier storage apparatus manages the second tier storage system by appropriate method directed by the second tier storage apparatus. In another method for managing HDDs' spin-down and spin-up, "spin-down/up" status are kept in the top tier storage apparatus and the second tier storage apparatus. The top tier storage apparatus forwards the "spin-down/up" request to the second tier storage apparatus when the top tier storage apparatus receives a "spin-down/up" request. The second tier storage apparatus checks if all volumes in a parity group have "spin-down" status. In the case of all volumes in a parity group have "spin-down" status, HDD in the parity group are spin-downed.

25 Claims, 29 Drawing Sheets

FOREIGN PATENT DOCUMENTS

| | | |
|---|---|---|
| GB | 2408626 A | 6/2005 |
| JP | 2005-157710 | 6/2005 |
| JP | 2005-157710 A | 6/2005 |
| JP | 2006-106980 | 4/2006 |
| JP | 2007-079754 | 3/2007 |
| JP | 2007-133821 | 6/2007 |
| JP | 2007-241334 | 9/2007 |
| JP | 2008-090352 | 4/2008 |

* cited by examiner

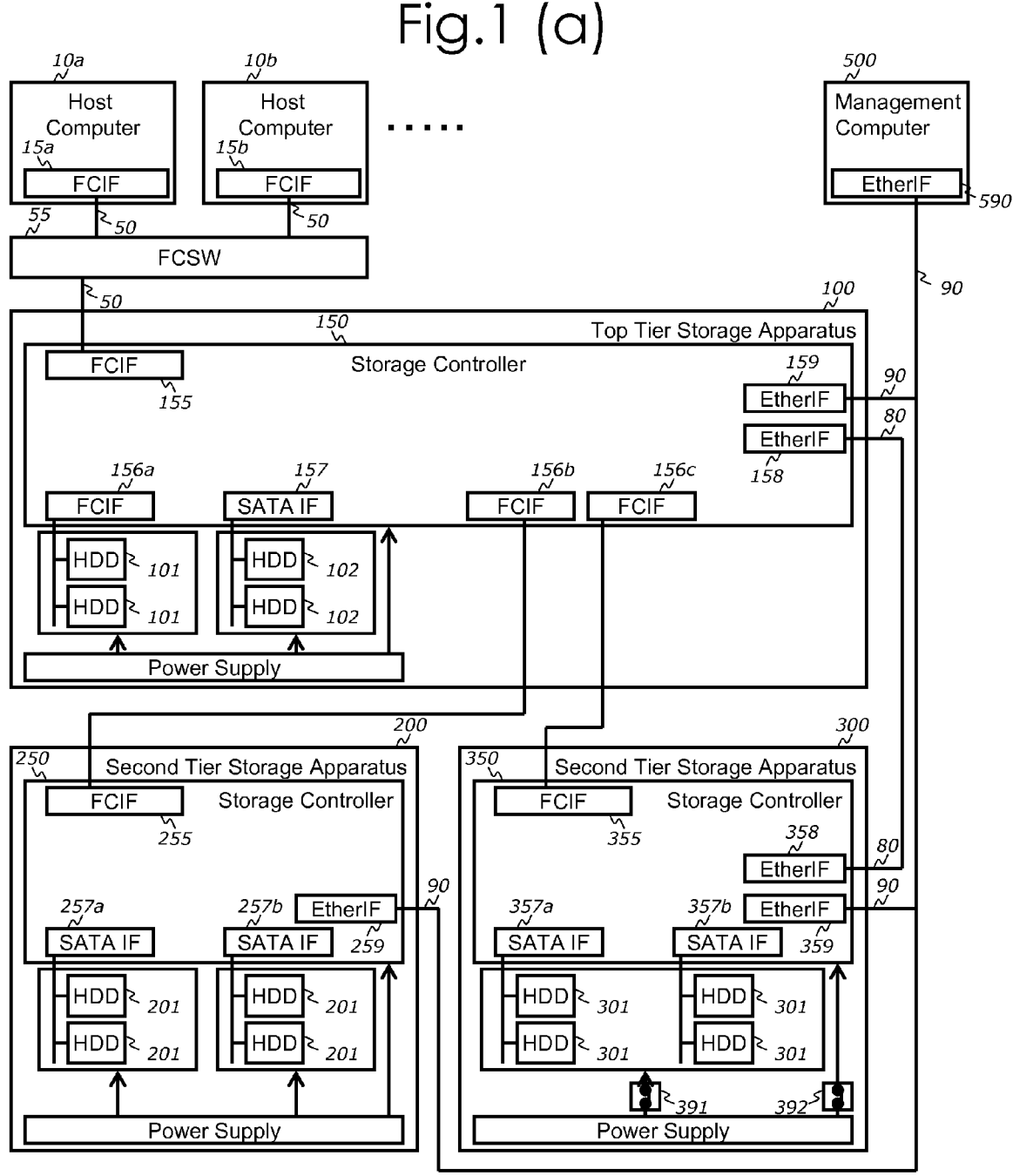

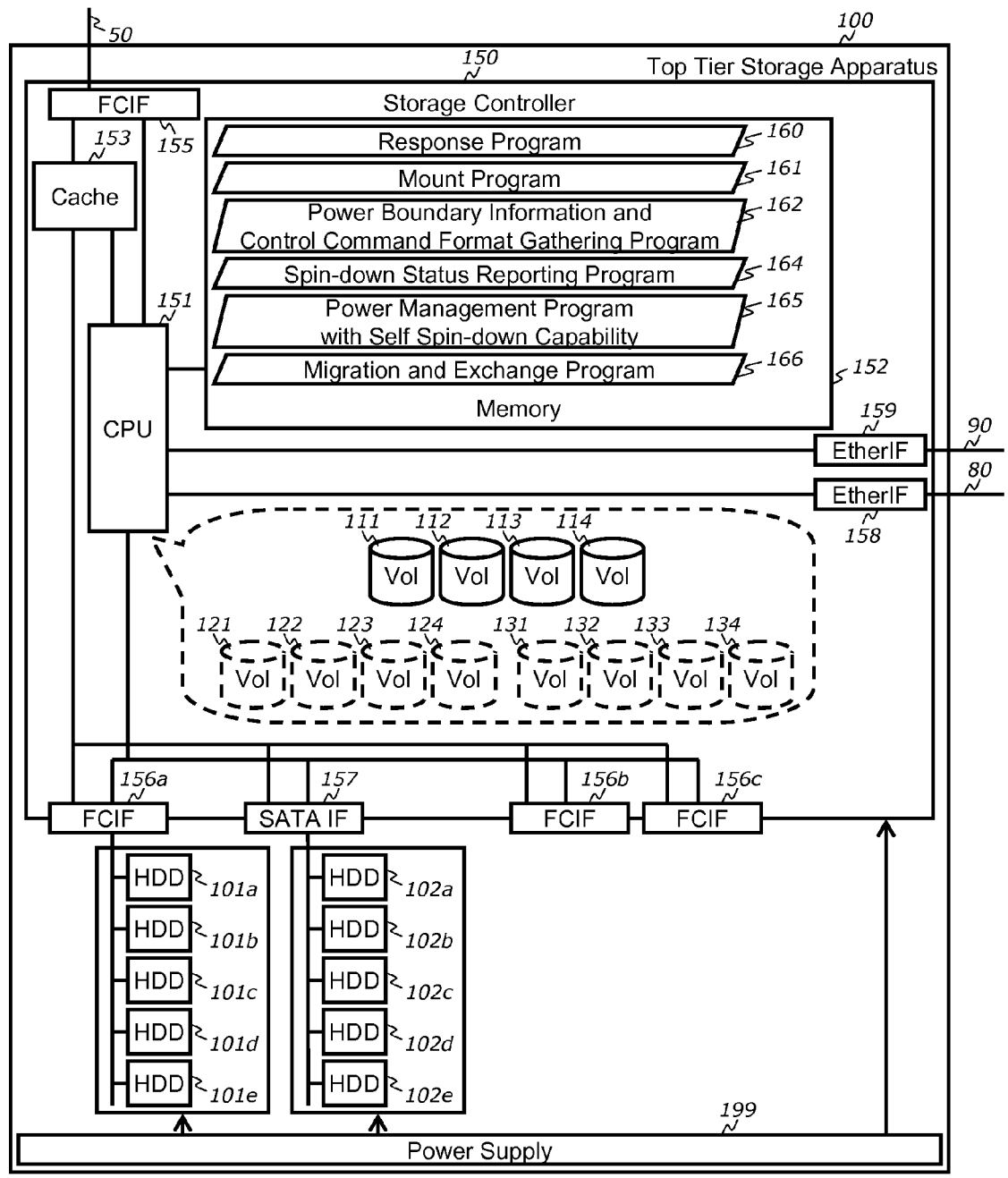

Fig.3

| Volume to Volume Map Table | | |
|---|---|---|
| Volume Number in Top Tier Storage | Second Tier Storage Number | Volume Number in Second Tier Storage |
| 111 | --- | |
| 112 | --- | |
| 113 | --- | |
| 114 | --- | |
| 121 | 200 | 211 |
| 122 | 200 | 212 |
| 123 | 200 | 213 |
| 124 | 200 | 214 |
| 131 | 300 | 311 |
| 132 | 300 | 312 |
| 133 | 300 | 313 |
| 134 | 300 | 314 |
| : | | |

Fig.4 (a)
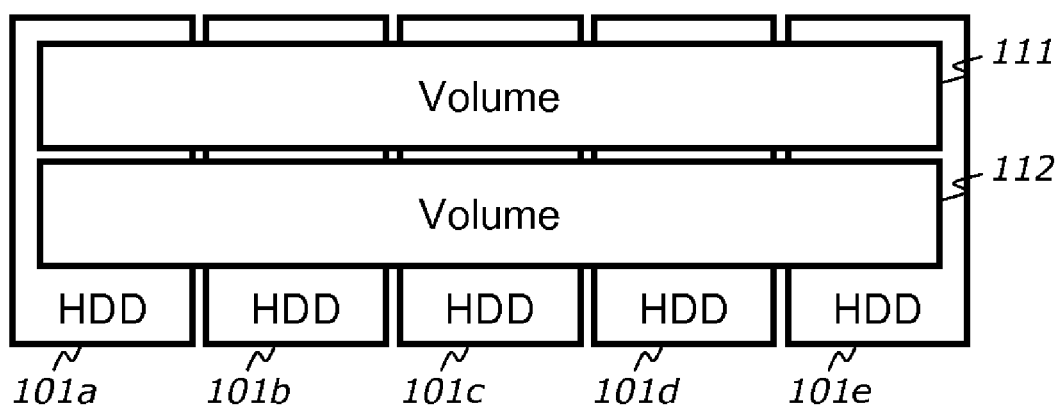
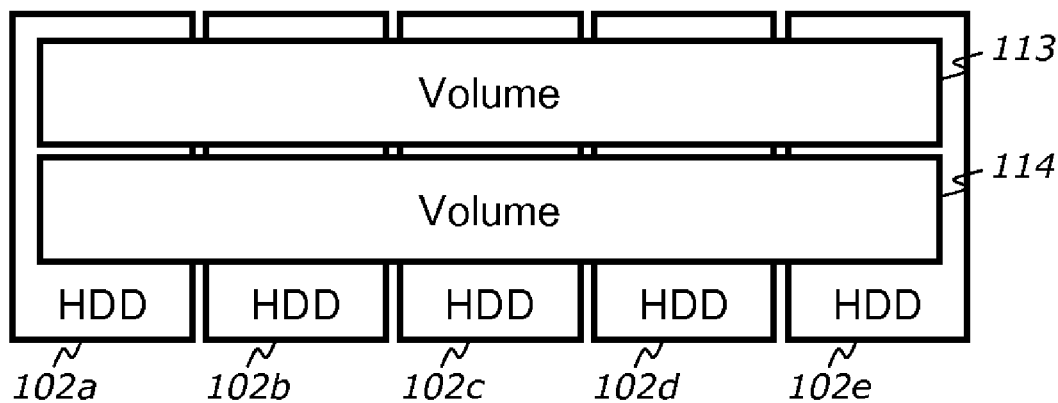

Fig.4 (b)
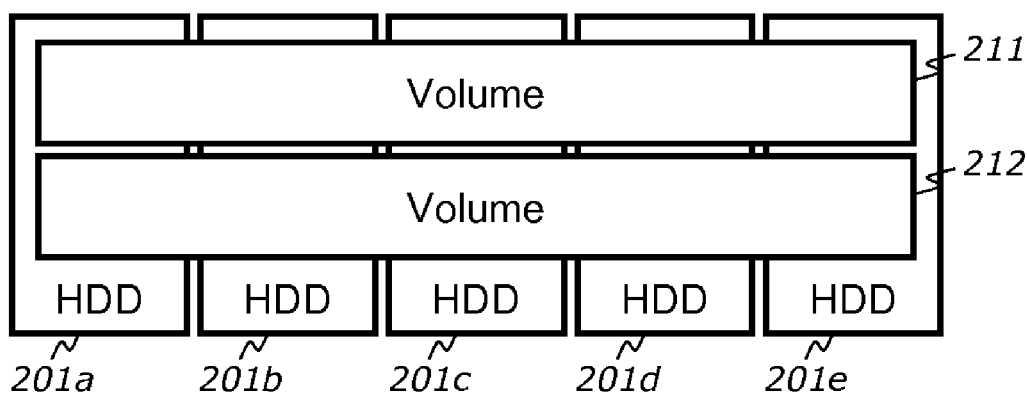
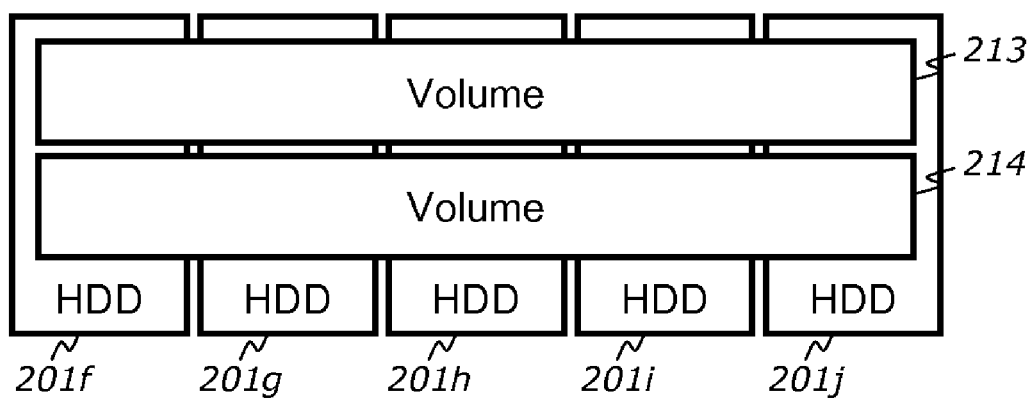

Fig.4 (c)
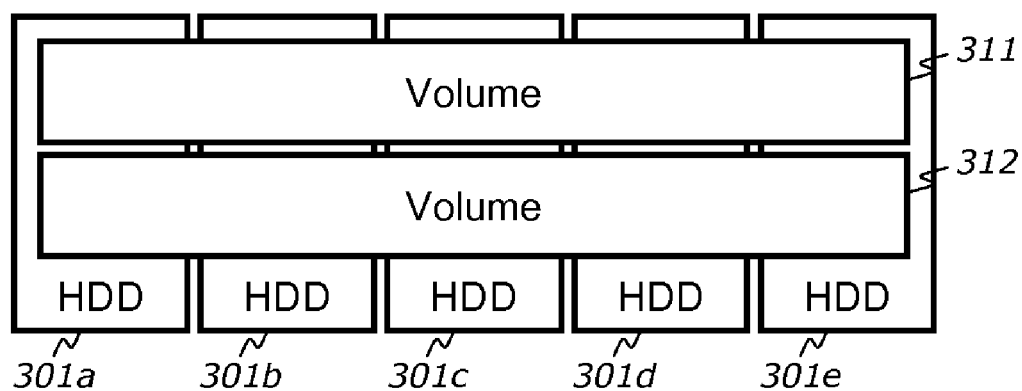
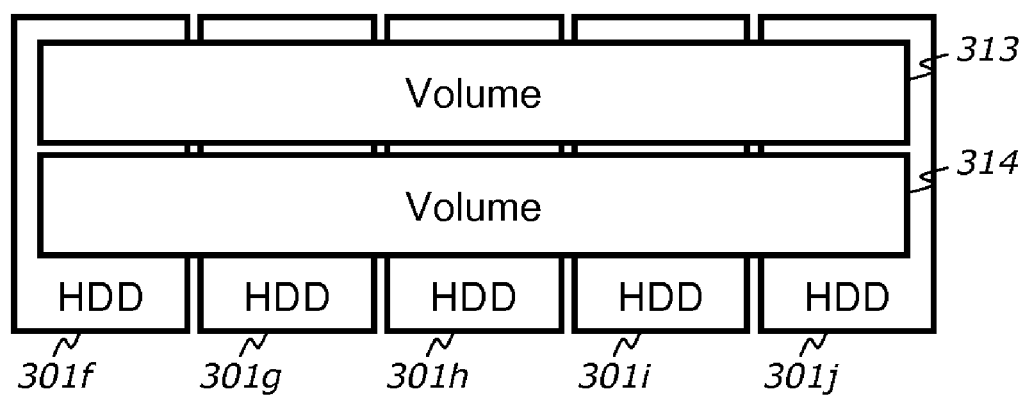

Fig.5 (a)

| Power Boundary Information ||| 
|---|---|---|
| Power Boundary Number | Volume Number | HDD |
| 51001 | 111<br>112 | 101a~101e |
| 51002 | 113<br>114 | 102a~102e |
| : |||

Fig.5 (b)

| Power Boundary Information |||||
|---|---|---|---|---|
| Power Boundary Number | Volume Number | HDD | Spin-down Command | Spin-up Command |
| 52001 | 211<br>212 | 201a~201e | "sd -pb 52001" | "su -pb 52001" |
| 52002 | 213<br>214 | 201f~201j | "sd -pb 52002" | "su -pb 52002" |
| : |||||

Fig.5 (c)

| Power Boundary Information | | | | | | |
|---|---|---|---|---|---|---|
| Power Boundary Number | Volume Number | HDD | Spin-down Command | Spin-up Command | Suspend Command | Resume Command |
| 53000 | 53001 | 311 312 | 301a~301e | "down 53001" | "up 53001" | "suspend 53000" | "resume 53000" |
| | 53002 | 313 314 | 301f~301j | "down 53002" | "up 53002" | | |
| : | | | | | | |

Fig.6

| Communication Method Table | | |
|---|---|---|
| Second Storage Number | Route | Target |
| 200 | Fibre Channel | 255 |
| 300 | Ethernet | 358 |
| : | | |

Fig.11

| Power Management Table | | | | | | | | | |
|---|---|---|---|---|---|---|---|---|---|
| Volume Number | Spin Down/Up Status | | Second Tier Storage Number | Power Boundary (1) | Spin-down Command | Spin-up Command | Power Boundary (2) | Suspend Command | Resume Command |
| | Host 10a | Host 10b | | | | | | | |
| 111 | up | down | --- | 51001 | N/A | N/A | N/A | N/A | N/A |
| 112 | up | down | --- | | | | | | |
| 113 | down | down | --- | 51002 | N/A | N/A | | | |
| 114 | down | down | --- | | | | | | |
| 121 | down | down | 200 | 52001 | "sd -pb 52001" | "su -pb 52001" | N/A | N/A | N/A |
| 122 | down | down | 200 | | | | | | |
| 123 | down | down | 200 | 52002 | "sd -pb 52002" | "su -pb 52002" | | | |
| 124 | down | down | 200 | | | | | | |
| 131 | down | down | 300 | 53001 | "down 53001" | "up 53001" | 53000 | "resume 53000" | "suspend 53000" |
| 132 | down | down | 300 | | | | | | |
| 133 | down | down | 300 | 53002 | "down 53002" | "up 53002" | | | |
| 134 | down | down | 300 | | | | | | |
| : | | | | | | | | | |

Fig.14

| Power Management Table | | | |
|---|---|---|---|
| Volume Number | Spin Down/Up Status | | Second Tier Storage Number |
| | Host 10a | Host 10b | |
| 111 | up | down | --- |
| 112 | up | down | --- |
| 113 | down | down | --- |
| 114 | down | down | --- |
| 121 | down | down | 200 |
| 122 | down | down | 200 |
| 123 | down | down | 200 |
| 124 | down | down | 200 |
| 131 | down | down | 300 |
| 132 | down | down | 300 |
| 133 | down | down | 300 |
| 134 | down | down | 300 |
| : | | | |

Fig.17

| Power Boundary Information ||||
|---|---|---|---|
| Storage Number | Power Boundary Number || Volume Number | Spin Down/Up Status |
| 400a | *Power Boundary* *Power Reduction Effect 500Watt* | *Power Boundary* |  | "up" |
| | | *Power Reduction Effect 50Watt* | 412a | "down" |
| | | *Power Boundary* | 413a | "down" |
| | | *Power Reduction Effect 50Watt* | 414a | "up" |

| Power Boundary Information ||||
|---|---|---|---|
| Storage Number | Power Boundary Number || Volume Number | Spin Down/Up Status |
| 400b | *Power Boundary* *Power Reduction Effect 500Watt* | *Power Boundary* | 411b | "down" |
| | | *Power Reduction Effect 50Watt* | 412b | "down" |
| | | *Power Boundary* | 413b | "up" |
| | | *Power Reduction Effect 50Watt* | 414b | "down" |

| Volume to Volume Map Table | | |
|---|---|---|
| Volume Number in Top Tier Storage | Second Tier Storage Number | Volume Number in Second Tier Storage |
| *111* | --- | |
| *112* | --- | |
| *113* | --- | |
| *114* | --- | |
| *121* | *400a* | *411a* |
| *122* | *400a* | *412a* |
| *123* | *400a* | *413a* |
| *124* | *400a* | *414a* |
| *131* | *400b* | *411b* |
| *132* | *400b* | *412b* |
| *133* | *400b* | *413b* |
| *134* | *400b* | *414b* |
| : | | |

(b)

| Volume to Volume Map Table | | |
|---|---|---|
| Volume Number in Top Tier Storage | Second Tier Storage Number | Volume Number in Second Tier Storage |
| *111* | --- | |
| *112* | --- | |
| *113* | --- | |
| *114* | --- | |
| *121* | *400a* | *411a* |
| *122* | *400a* | *412a* |
| *123* | *400b* | *413b* |
| *124* | *400a* | *414a* |
| *131* | *400b* | *411b* |
| *132* | *400b* | *412b* |
| *133* | *400a* | *413a* |
| *134* | *400b* | *414b* |
| : | | |

Fig.19

| Storage Number | Power Boundary Number | | Volume Number | Spin Down/Up Status |
|---|---|---|---|---|
| 100 | --- | 51001 | 111 | up |
| | | | 112 | up |
| | | 51002 | 113 | down |
| | | | 114 | down |

| Storage Number | Power Boundary Number | | Volume Number | Spin Down/Up Status |
|---|---|---|---|---|
| 200 | --- | 52001 | 121 | down |
| | | | 122 | down |
| | | 52002 | 123 | down |
| | | | 124 | down |

| Storage Number | Power Boundary Number | | Volume Number | Spin Down/Up Status |
|---|---|---|---|---|
| 300 | 53000 | 53001 | 131 | down |
| | | | 132 | up |
| | | 53002 | 133 | down |
| | | | 134 | down |

Fig.21

| Power Management Table | | | | | | | | |
|---|---|---|---|---|---|---|---|---|
| Volume Number | Spin-up Counter | Second Tier Storage Number | Power Boundary (1) | Spin-down Command | Spin-up Command | Power Boundary (2) | Suspend Command | Resume Command |
| 111 | 1 | --- | 51001 | N/A | N/A | N/A | N/A | N/A |
| 112 | 1 | --- | | | | | | |
| 113 | 0 | --- | 51002 | N/A | N/A | | | |
| 114 | 0 | --- | | | | | | |
| 121 | 0 | 200 | 52001 | "sd -pb 52001" | "su -pb 52001" | N/A | N/A | N/A |
| 122 | 0 | 200 | | | | | | |
| 123 | 0 | 200 | 52002 | "sd -pb 52002" | "su -pb 52002" | | | |
| 124 | 0 | 200 | | | | | | |
| 131 | 0 | 300 | 53001 | "down 53001" | "up 53001" | 53000 | "resume 53000" | "suspend 53000" |
| 132 | 0 | 300 | | | | | | |
| 133 | 0 | 300 | 53002 | "down 53002" | "up 53002" | | | |
| 134 | 0 | 300 | | | | | | |
| : | | | | | | | | |

METHODS AND APPARATUS FOR MANAGING HDD'S SPIN-DOWN AND SPIN-UP IN TIERED STORAGE SYSTEMS

DESCRIPTION OF THE INVENTION

1. Field of the Invention

This invention is generally related to storage system and, more specifically, to the methods and apparatus for managing hard disk drives (HDDs) spin-down and spin-up for reducing electric power consumption at storage system.

2. Description of the Related Art

Various techniques have been developed to reduce electric power consumption in storage systems. Some such techniques involve HDDs' spin-down and spin-up procedures. For example, British patent application No. GB2408626 (which corresponds to Japanese patent application No. JP2005-157710) entitled: "Power control of disk units within an array," describes a system for managing the HDDs spin-down and spin-up procedures. However, according to the aforesaid reference, HDDs spin-down and spin-up is managed in accordance to a request issued by the host computers coupled to the aforesaid storage apparatus. The storage apparatus, which receives the request from the host computer, manages spin-down and spin-up of the HDDs within the storage apparatus. The aforesaid patent applications No. GB2408626 and No. JP2005-157710 are incorporated herein in their entirety.

Moreover, the aforesaid existing technology fails to address managing spin-down and spin-up of the HDDs in a tiered storage configuration, wherein the storage system resources are arranged into multiple tier structure.

Thus, the existing technology relies exclusively on host computers for generating commands to spin up and spin down HDDs in storage systems and fails to provide power saving technology utilizing managing HDD's spin-down and spin-up at tiered storage configuration for reducing electric power consumption and providing simple control methods to the management computer and/or the host computer.

SUMMARY OF THE INVENTION

The inventive methodology is directed to methods and systems that substantially obviate one or more of the above and other problems associated with conventional techniques for managing power consumption in storage systems.

In accordance with one aspect of the inventive methodology, there is provided a computerized data storage system including a top tier storage apparatus; and a second tier storage apparatus, connected to the top tier storage apparatus. The second tier storage apparatus incorporates one or more hard disk drives configured to store data organized into one or more second tier logical volumes. The top tier storage apparatus is configured to: map the one or more second tier logical volumes to one or more top tier logical volumes; create a map of a correspondence of the top tier logical volumes to the second tier logical volumes and power boundary information from the second tier storage apparatus; provide the top tier logical volumes to a host computer such that the second tier storage apparatus is transparent to the host computer and manage the second tier storage apparatus by instructing the second tier storage apparatus to spin-up or spin down one or more of the hard disk drives of the second tier storage apparatus corresponding to one or more logical data volumes.

In accordance with another aspect of the inventive methodology, there is provided a computerized data storage system including a top tier storage apparatus coupled to a host computer. The top tier storage apparatus incorporates one or more hard disk drives configured to store data organized into one or more top tier logical data volumes; the top tier storage apparatus configured to store spin-down and spin-up status of the one or more top tier logical data volumes; and a second tier storage apparatus, connected to the top tier storage apparatus. The second tier storage apparatus includes one or more hard disk drives configured to store data organized into one or more second tier logical data volumes, the top tier storage apparatus configured to store spin-down and spin-up status of the one or more second tier logical data volumes. The top tier storage apparatus is further configured to forward the received spin-up or spin-down request to the second tier storage apparatus when the top tier storage apparatus receives the spin-up or spin-down request from the host computer and the second tier storage apparatus is configured to check if all volumes in a parity group have "spin-down" status, in the case the all volumes in the parity group have the "spin-down" status, the second tier storage apparatus is configured to spin-down all HDDs in the parity group.

In accordance with yet another aspect of the inventive methodology, there is provided a method performed in a computerized data storage system including a top tier storage apparatus incorporating one or more hard disk drives configured to store data organized into one or more top tier logical data volumes; and a second tier storage apparatus, connected to the top tier storage apparatus. The second tier storage apparatus incorporates one or more hard disk drives configured to store data organized into one or more second tier logical data volumes. The inventive method involves: gathering a map of a correspondence of the top tier logical volumes to the second tier logical volumes and power boundary information from the second tier storage apparatus; providing top tier logical volumes to a host computer such that the second tier storage apparatus is transparent to the host computer; and managing the second tier storage apparatus by instructing the second tier storage apparatus to spin-up or spin down one or more of the hard disk drives of the second tier storage apparatus corresponding to one or more logical data volumes.

In accordance with a further aspect of the inventive methodology, there is provided a method performed in a computerized data storage system including a top tier storage apparatus coupled to a host computer. The top tier storage apparatus includes one or more hard disk drives configured to store data organized into one or more top tier logical data volumes. The top tier storage apparatus is configured to store spin-down and spin-up status of the one or more top tier logical data volumes; and a second tier storage apparatus, connected to the top tier storage apparatus. The second tier storage apparatus includes one or more hard disk drives configured to store data organized into one or more second tier logical data volumes. The inventive method involves: storing spin-down and spin-up status of the one or more second tier logical data volumes; forwarding the received spin-up or spin-down request to the second tier storage apparatus when the top tier storage apparatus receives the spin-up or spin-down request from the host computer; and checking if all volumes in a parity group have "spin-down" status and in the case the all volumes in the parity group have the "spin-down" status, spinning-down all HDDs in the parity group.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 (b) illustrates an exemplary embodiment of a host computer.

FIG. 1 (c) illustrates an exemplary embodiment of a management computer.

FIG. 1 (d) illustrates an exemplary embodiment of a top tier storage apparatus.

FIG. 1 (e) illustrates an exemplary embodiment of a second tier storage apparatus.

FIG. 1 (f) illustrates another exemplary embodiment of a second tier storage apparatus.

FIG. 3 illustrates an exemplary embodiment of a volume-to-volume map table in the top storage apparatus 100.

FIG. 4 (a) illustrates an exemplary relationship between HDDs and volumes in this embodiment.

FIG. 4 (b) illustrates another exemplary relationship between HDDs and volumes in this embodiment.

FIG. 4 (c) illustrates another exemplary relationship between HDDs and volumes in this embodiment.

FIG. 5 (a) illustrates exemplary power boundary information in the top tier storage apparatus.

FIG. 5 (b) illustrates exemplary power boundary information in the second tier storage apparatus.

FIG. 5 (c) illustrates exemplary power boundary information in the second tier storage apparatus.

FIG. 6 illustrates exemplary communication method table in the top tier storage apparatus.

FIG. 13 (b) illustrates an exemplary implementation of a second tier storage apparatus of the second embodiment.

FIG. 14 illustrates an exemplary power management table.

FIG. 16 (b) shows an exemplary volume-to-volume map.

FIG. 17 illustrates two spin-down states that are reported from one or more of the second tier storage apparatuses.

FIG. 18 illustrates an exemplary state of the volume-to-volume map table.

FIG. 19 illustrates an exemplary spin-down status.

FIG. 21 illustrates an exemplary power management table for this embodiment of the inventive concept.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

This invention deals with methods and apparatus for managing HDD's spin-down and spin-up for reducing electric power consumption in storage system. One embodiment of the invention is especially applicable to a storage system configured as tiered storage (composed of top tier storage apparatuses and second tier storage apparatus). Of cause part of this invention can apply to the non tired storage configuration also. Other number of tier, three, four and more, can be configurable.

In one embodiment of the inventive methodology, the storage system is configured as a tiered storage, which is being composed of at least top tier storage apparatuses and second tier storage apparatuses (devices).

First Embodiment

In first embodiment of the inventive technique, the top tier storage apparatus gathers the volume-to-volume map information and power boundary information from second tier storage devices, which are connected to the top tier storage apparatus. The top tier storage apparatus manages the second tier storage system by appropriate method as directed by the second tier storage apparatus.

Second Embodiment

In another embodiment of the inventive technique for managing spin-down and spin-up of HDDs, "spin-down/up" status information is kept in both the top tier storage apparatus and the second tier storage apparatus. The top tier storage apparatus forwards the "spin-down/up" request to the second tier storage apparatus when the top tier storage apparatus receives a "spin-down/up" request. The second tier storage apparatus checks whether the status of all volumes in a parity group is "spin-down". In the case of all volumes in a parity group having "spin-down" status, corresponding HDDs in the parity group are spun-downed. The above and other embodiments and implementations of the inventive methodology will now be described in detail.

First Embodiment

Figure 1:
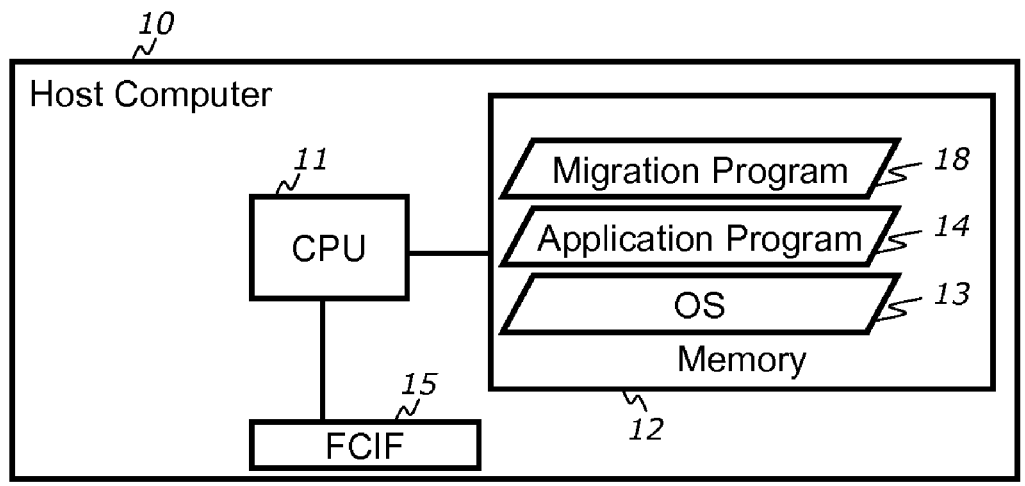
FIG. 1 (a) illustrates a general overview of an exemplary embodiment of an information system in which one or more of the methods of the inventive concept may be applied.
Figure 1:
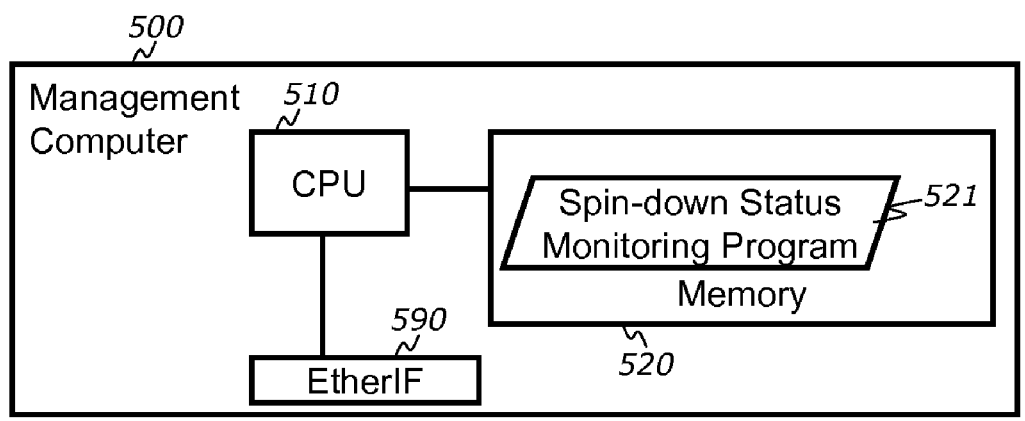
Figure 1:
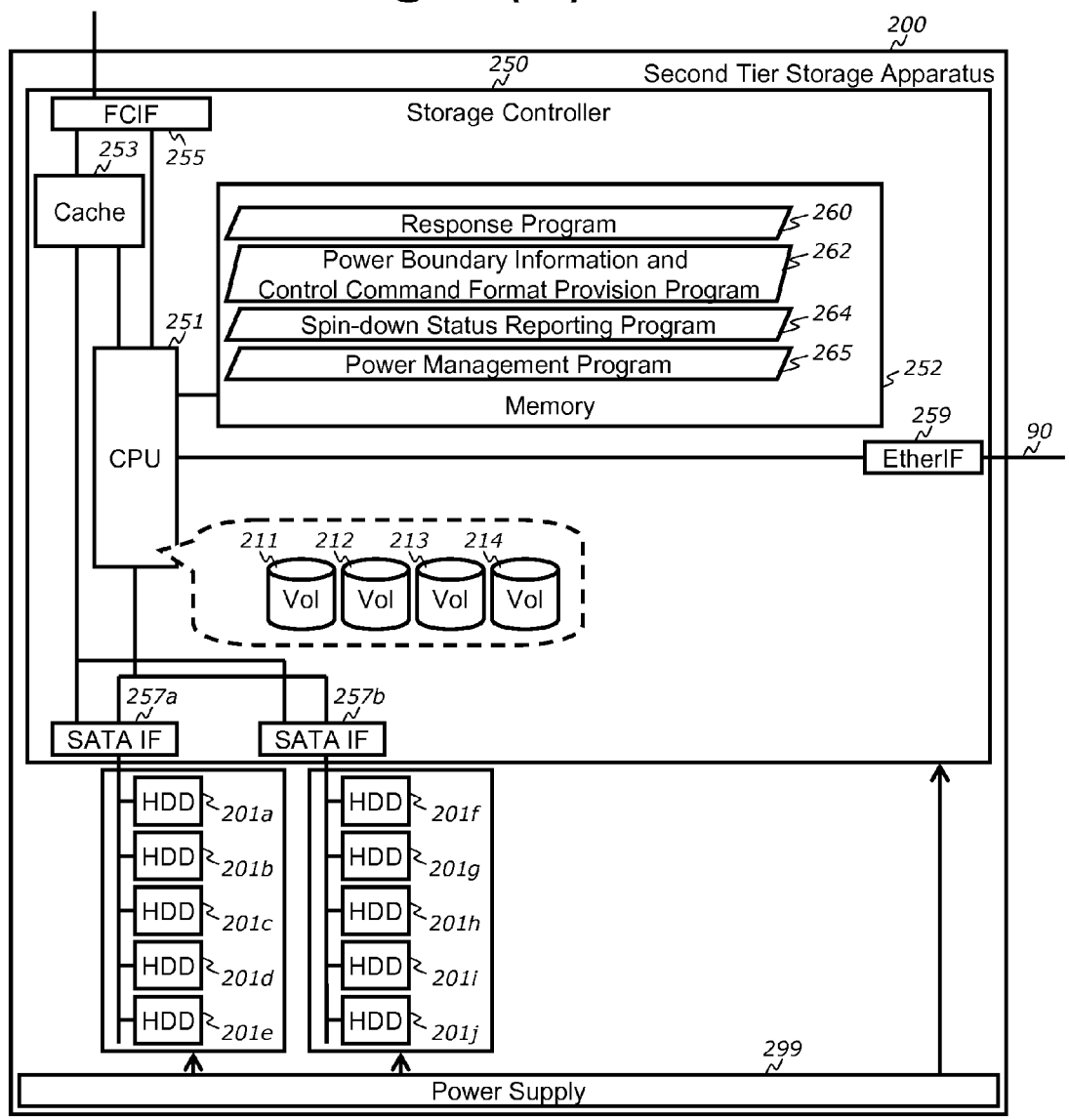
Figure 1:
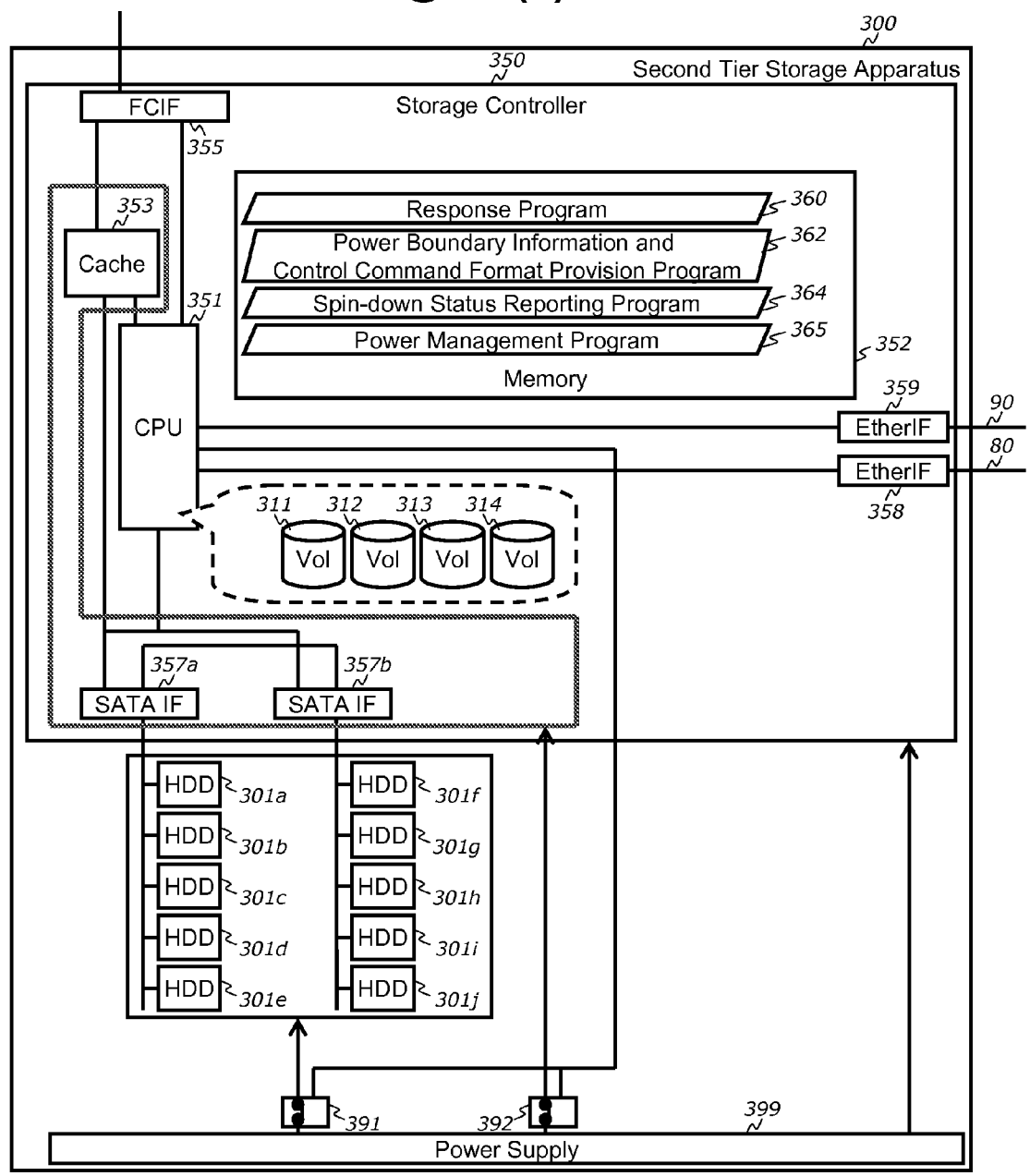

System Configuration:

FIG. 1 illustrates an exemplary embodiment of an information system in which one of the methods of this invention may be applied. The information system for the first embodiment may incorporate one or more of the following components, singly or in any combination.

Host Computer 10:

The aforesaid information system may incorporate at least one host computer 10, which may be connected to the storage apparatus 100 via a data network 50. In the embodiment shown in FIG. 1(a), two host computers 10a and 10b are connected to the storage apparatus 100. The host computers 10a and 10b may execute an operating system (OS) 13, see FIG. 1(b). In addition, the computers 10a and 10b may execute an application program under the direction of the OS 13. Files and data for the OS 13 and the application program 14 are stored in data volumes, which are provided by the storage apparatus 100. The OS 13 and the application program 14 issue write and/or read command to the storage apparatus 100.

Top Tier Storage Apparatus 100:

The aforesaid information system may further incorporate at least one top tier storage apparatus 100, which is composed of storage controller 150 and one or more HDDs 101 and 102. In this embodiment, one top tier storage apparatus 100 is provided. In this embodiment, five HDDs 101a~101e are connected to the storage controller 150 via Fibre Channel connection and five HDDs 102a~102e are connected to the storage controller 150 via SATA connection. As would be appreciated by one of skill in the art, the present invention is not limited only to Fibre Channel and SATA connections and any other suitable data interconnect technology can be used.

Second Tier Storage Apparatus 200 and 300:

The aforesaid information system may further incorporate at least one second tier storage apparatus, which may incorporate storage controller and one or more HDDs. In this embodiment, two second tier storage apparatus 200 and 300 are provided and connected to the top tier storage apparatus 100 via Fibre Channel connection. Internal configuration of the second tier storage apparatus 200 and 300 are similar except power management control methods. The differences are described below. In this embodiment ten HDDs 201a~201j are connected to the storage controller 250 via SATA connection and ten HDDs 301a~301j are connected to the storage controller 350 via SATA connection.

Management Computer 500:

The aforesaid information system may further incorporate at least one management computer 500, which is connected the top tier storage apparatus 100, the second tier storage apparatus 200 and 300 via management network 90.

Data Network 50:

In the shown embodiment, the host computer 10 and the top tier storage apparatus 100 are connected via data network 50. The data network 50 in this embodiment is Fibre Channel. However other suitable networks including, without limitation, Ethernet and Infiniband can be used as well. Network switches and hubs can be used for achieving this connectivity. In the embodiment illustrated in FIG. 1 (a), Fibre Channel Switch 55 (FCSW 55) is used for achieving the aforesaid connectivity. The host computer 10 and the top tier storage apparatus 100 may incorporate one or more Fibre Channel interface board (FCIF) for connecting to the Fibre Channel data network 50.

Power Management Network 80:

The top tier storage apparatus 100 and the second tier storage apparatus are interconnected via a power management network 80. The power management network 80 in this embodiment is implemented based on the Ethernet standard. However other suitable networks or data transfer means (ex. RS232C) can be used for this purpose. Network switches and hubs can be used for interconnecting various components of such networks. The top tier storage apparatus 100 and the second tier storage apparatus 300 have one or more Ethernet interface boards (EtherIF) 158 and 358 for connecting to the Ethernet power management network 80.

Management Network 90:

The top tier storage apparatus 100, the second tier storage apparatus 200 and 300 are connected to the management computer 500 via a management network 90. The management network 90 in this embodiment is implemented using Ethernet interconnect. However other suitable network interconnects can be used for this purpose. Various elements of the management network 90 may be interconnected using switches and hubs. The top tier storage apparatus 100, the second tier storage 200, 300 and the management computer 500 may incorporate one or more Ethernet interface board (EtherIF) 159, 359 and 590 for connecting to the Ethernet management network 90.

The Host Computer 10 will now be described in detail with reference to FIG. 1(b). The host computer 10 may incorporate: a CPU 11 for executing programs stored in a memory 12; the memory 12 for storing various programs and data; a FCIF 15 for connecting to the data network 50 and at least three programs, stored in the memory 12, which are executed by the CPU 11. In this exemplary embodiment, the memory 12 stores at least: operating system program 13 (OS 13); application program 14; and migration program 18 for migrating all files in one data volume to another volume.

The exemplary implementation of the Management Computer 500 will now be described in detail with reference to FIG. 1(c). The management computer 500 may incorporate: a CPU 510 for executing programs stored in a memory 520; the memory 520 for storing the programs and data; an EtherIF 590 for connecting to the management network 90 and at least one program stored in the memory 520 and executed by the CPU 510.

In this embodiment, the memory 520 stores at least: spin-down status monitor program 521 for monitoring spin-down status at the storage apparatuses. The spin-down status monitor program 521 may be used for issuing volume exchange requests for reducing electric power consumption (mentioned in second embodiment).

The top tier storage apparatus 100 will now be described in detail with reference to FIG. 1(d). The storage apparatus 100 may incorporate one or more HDDs 101 and 102 for storing data. In an embodiment of the invention, the HDD 101 and HDD 102 can accept spin-down and spin-up commands. HDDs 101 may be interconnected via a Fibre Channel connection, while HDDs 102 may be interconnected via a SATA connection. Typically, the power consumption per capacity of HDDs 102 is less than HDDs 101. The storage apparatus 100 may further incorporate one or more storage controllers 150 for providing data volumes to the host computers and one or more power supplies 199 for supplying electric power to the HDDs and the storage controller 150.

The storage controller 150 may incorporate: a CPU 151 for executing programs stored in memory 152; a memory 152 for storing programs and data; a cache 153 for storing data received from the host computer and read from the HDD or the second tier storage apparatuses; a CIF 155 for connecting to the data network 50; a FCIF 156a for connecting to HDD 101 and FCIFs 156b and 156c for connecting to the second tier storage apparatuses. If the second tier storage apparatus utilizes another interface such as Ethernet, Infiniband, SAS, appropriate interface should be implemented.

The storage controller 150 may further incorporate a SATA IF 157 for connecting to the HDD 102 (if HDDs have another interface such as SCSI, SAS, an appropriate other interface should be implemented.); EtherIF 158 for connecting to the power management network 80; EtherIF 159 for connecting to the management network 90 and at least six programs stored in memory 152 and executed by the CPU 151. These six programs will be described in detail below.

Specifically, in this embodiment, the memory 152 stores: a response program 160 for responding to READ/WRITE command from the host computer 10; a mount program 161 for mounting volumes provided by the second tier storage apparatus; a power boundary information and control command format gathering program 162 for gathering power boundary information from the second tier storage apparatus; a spin-down status reporting program 164 for reporting current spin-down status and other power supply status to the management computer 500; a power management program 165 for managing HDD's spin-down, spin-up and power supply by issuing request which are gathered by the power control command gathering program 163 and migration and exchange program 166 for migrating data in the volume from one volume to another volume and/or swapping data in two volumes.

The storage apparatus 200 will now be described in detail with reference to FIG. 1(e). Specifically, the storage apparatus 200 may incorporate one or more HDDs 201 for storing data. In this embodiment, the HDDs 201 are configured to accept spin-down and spin-up requests. The storage apparatus 200 may further incorporate one or more storage controllers 250 for providing data volumes to the host computers; and one or more power supplies 299 for supplying electric power to the HDDs and the storage controller 250.

The storage controller 250 may incorporate: a CPU 251 for executing programs stored in memory 252; a Memory 252 for storing programs and data; a Cache 253 for storing data received from the top tier storage apparatus and read from the HDD; a FCIF 255 for connecting to the top tier storage apparatus 100; a SATA IF 257 for connecting to the HDDs 201 (if HDD has another interface such as SCSI, SAS, appropriate interface should be implemented.); an EtherIF 259 for connecting the controller 250 to the management network 90 and at least four programs stored in the memory 252 and executed by the CPU 251.

In this embodiment, the memory 252 stores at least: a response program 260 for responding to READ/WRITE commands from the top tier storage apparatus 100; a power boundary information and control command format provision program 262 for providing power boundary information to the top tier storage apparatus; a spin-down status reporting program 264 for reporting current spin-down status and other power supply status to the management computer 500 and a power management program 265 for managing HDDs' spin down, and spin-up and controlling a power supply according to requests received from the top tier storage apparatus.

The storage apparatus 300 will now be described in detail with reference to FIG. 1(f). The storage apparatus 300 may incorporate one or more HDDs 301 for storing data. The HDDs 301 are configured to accept spin-down and spin-up requests. The storage apparatus 300 may further incorporate one or more storage controllers 350 for providing data volumes to the host computers and a switch 391 for controlling electric power supply to the HDDs. This switch 391 is controlled by the CPU 351. The storage apparatus 300 may further incorporate a switch 392 for controlling electric power supply to cache 353 and a SATA IF 357 as well as one or more power supplies 399 for supplying electric power to the HDDs and the storage controller 350.

The storage controller 350 may incorporate a CPU 351 for executing programs stored in a memory 352; the memory 352 for storing programs and data; a cache 353 for storing data received from the top tier storage apparatus and read from the HDD(s); a FCIF 355 for connecting to the top tier storage apparatus 100; a SATA IF 357 for connecting to the HDD 301 (if HDD has another interface such as SCSI, SAS, the corresponding other appropriate interface should be implemented.); an EtherIF 358 for connecting to the power management network 80; an EtherIF 359 for connecting to the management network 90 and at least four programs stored in the memory 352 and executed by the CPU 351.

In this embodiment, the memory 352 may store a response program 360 for responding to READ/WRITE command from the top tier storage apparatus 100; a power boundary information and control command format provision program 362 for providing power control command format to the top tier storage apparatus; a spin-down status reporting program 364 for reporting current spin-down status and other power supply status to the management computer 500 and a power management program 365 for managing HDDs' spin down, and spin-up and power supply according to request from the top tier storage apparatus.

Figure 2:
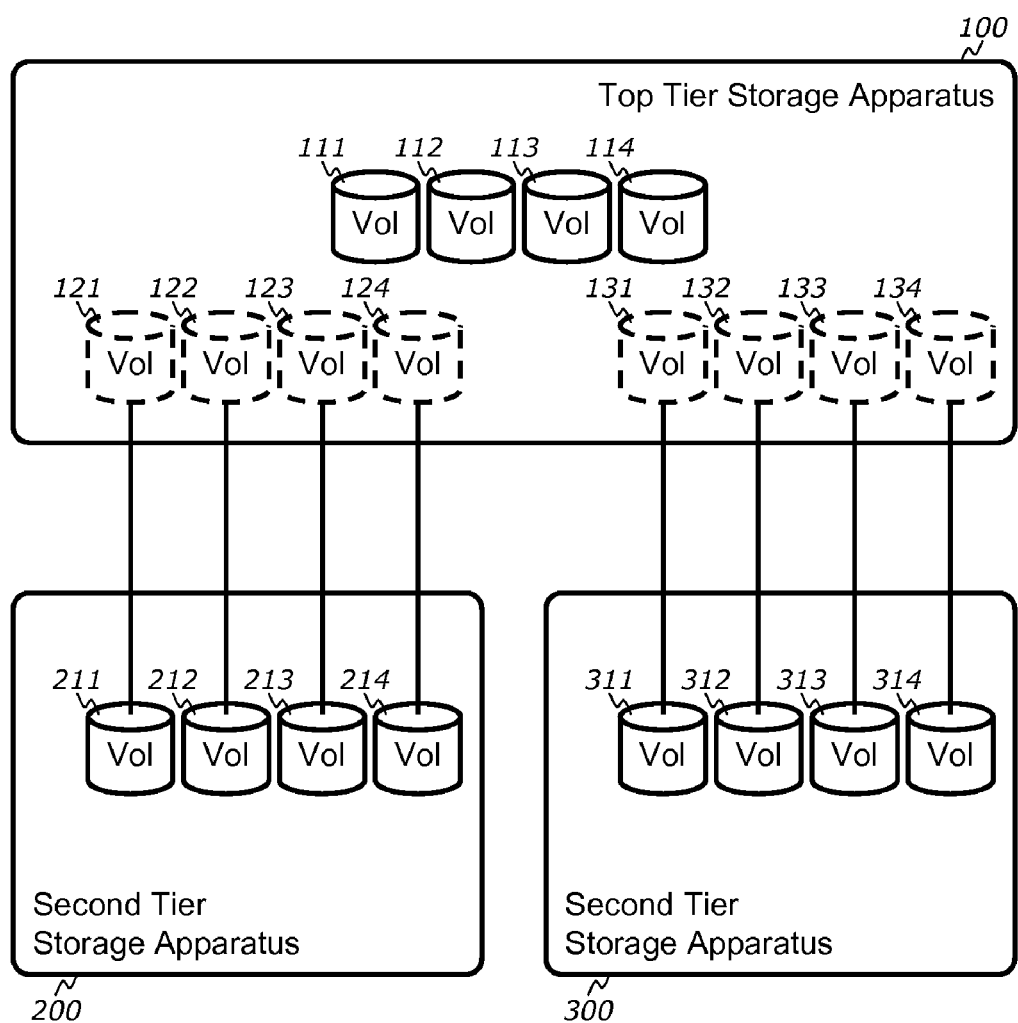
FIG. 2 illustrates an exemplary embodiment of a volume mapping configuration.

FIG. 2 illustrates an exemplary implementation of a volume mapping configuration in this embodiment. The top tier storage apparatus 100 provides twelve volumes to the host computer (not shown). The volumes 111~114 are provided by the HDDs in the top tier storage apparatus 100 itself. The volumes 121~124 are provided by volumes in the second tier storage apparatus 200. Also, the volumes 131~134 are provided by volumes in the second tier storage apparatus 300. In one implementation, the volumes in the second tier storage apparatus are mounted by the mount program 161 at system initialization phase. The volume-to-volume map table in the top tier storage apparatus 100 is initialized as shown in FIG. 3. In this embodiment, the top tier storage apparatus conceals the second tier storage apparatuses from the host computers' view. Specifically, the operation of the host computers is not affected in any way by the fact that the specific data volume is provided by the second tier storage, as opposed to the top tier storage, in other words, such second tier storage is transparent to the host computers.

HDD to Volume Mapping

FIG. 4(a)-(c) illustrates exemplary relationship between HDDs and volumes in this embodiment. Specifically, as shown in this figure, volumes 111 and 112 are located on HDDs 101a~101e, volumes 113 and 114 are on HDD 102a~102e; volumes 211 and 212 are on HDD 201a~201e; volumes 213 and 214 are on HDD 201f~201j; volumes 311 and 312 are on HDD 301a~301e and volumes 313 and 314 are on HDD 301f~301j.

Power Boundary Information

FIG. 5(a) illustrates exemplary implementation of power boundary information in the top tier storage apparatus 100. In the shown example, the top tier storage apparatus 100 has two power boundaries 51001 and 51002. Also in the illustrated embodiment, the top tier storage apparatus has a "self spin-down capability". This capability is described in detail below.

FIG. 5 (b) illustrates exemplary power boundary information in the second tier storage apparatus 200. In the shown example, the second tier storage apparatus 200 has two power boundaries 52001 and 52002. For example, HDDs 201a~201e can be spin-downed by command "sd -pb 52001". This spin-down ("sd -pb 52001") has affect on the two data volumes 211 and 212.

FIG. 5 (c) shows the power boundary information in the second tier storage apparatus 300. The second tier storage apparatus 300 has three power boundaries 53000, 53001 and 53002. For example, HDD 301a~301e can be spin-downed by command "down 53001". This spin-down ("down 53001") has an affect on two volumes 311 and 312. The "suspend 53000" command suspends the second tier storage apparatus itself. Electric power supply to HDD 301, cache 353 and SATA IF 357 is stopped by controlling the switch 391 and 392. Dirty data in the cache 353 must be flushed to the HDD before entering suspend state. This suspend ("suspend 53000") has an affect on four volumes 311, 312, 313 and 314.

As mentioned above, each storage apparatus has each own command format and power boundary. The top tier storage apparatus conceals these differences.

Gathering the Power Boundary Information:

FIG. 6 shows communication method table 168 in the top tier storage apparatus 100. This communication method table 168 may be initialized by an administrator. The top tier storage apparatus 100 may try communicating by several standard methods if the top tier storage apparatus know standard communication method. In this embodiment, power management communication is executed via Fibre Channel between the top tier storage apparatus 100 and the second tier storage apparatus 200. Requests are issued to the FCIF 255. Also power management communication is executed via Ethernet between the top tier storage apparatus 100 and the second tier storage apparatus 300. Requests are issued to the EtherIF 358.

The power boundary information and control command format gathering program 162 in the top tier storage apparatus 100 issues requests for getting the power boundary information to the power boundary information and control command format provision program 262 and 362 in the second tier storage apparatus 200 and 300. The power boundary information and control command format provision program 262 returns the power boundary information shown in FIG. 5 (b). The power boundary information and control command format provision program 362 returns the power boundary information shown in FIG. 5 (c). These gathered power boundary information are stored in the memory 152. This power boundary information gathering is executed at system initialization phase.

Operation of the Host Computer 10a

Figure 7:
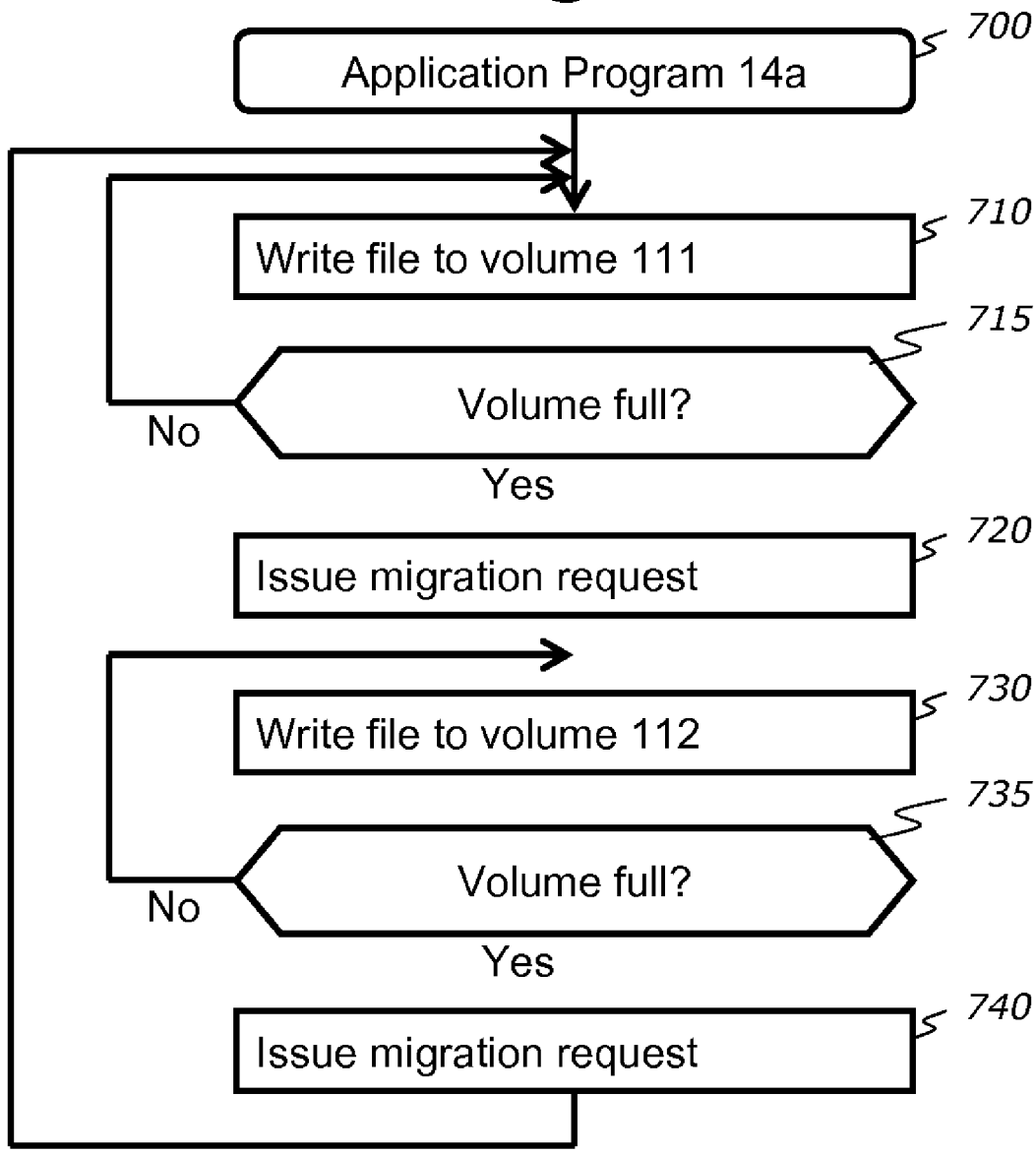
FIG. 7 illustrates exemplary process flow for the application program in the host computer.
Figure 8:
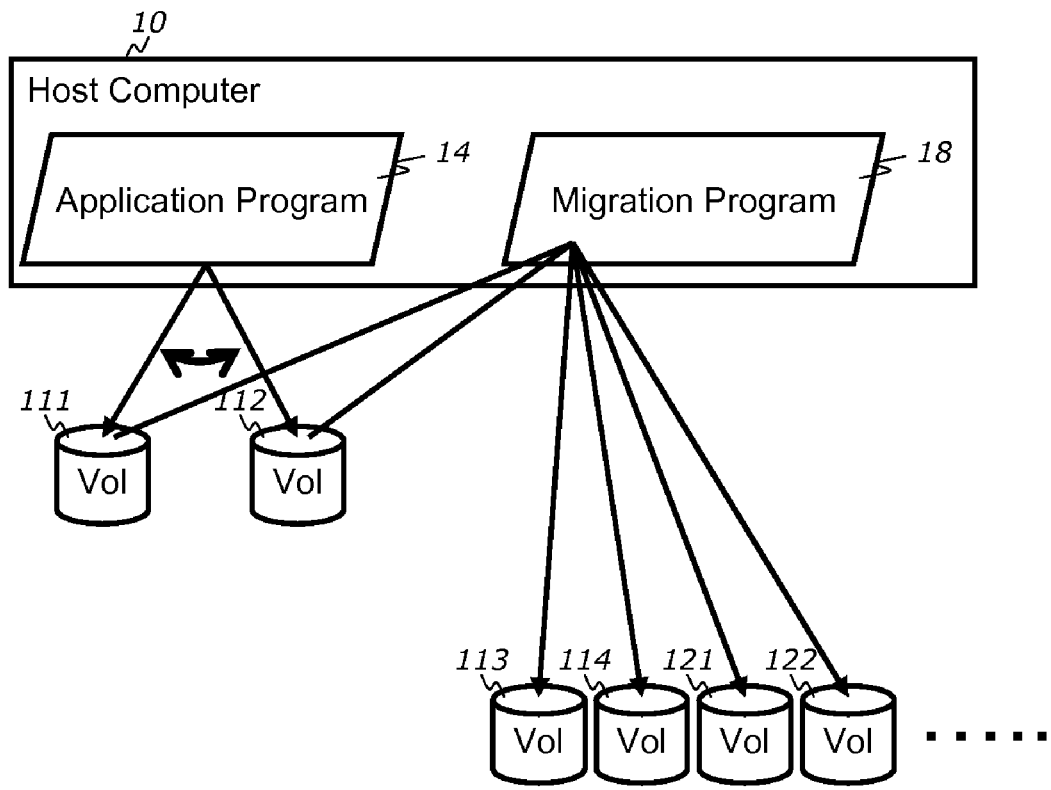
FIG. 8 illustrates exemplary data flow among volumes related to process flow shown in FIG. 7.

FIG. 7 shows process flow for the application program 14a in the host computer 10a. FIG. 8 shows data flow among volumes related to process flow shown in FIG. 7. This type of process flow is common in computer systems. For example, mail archiving and transaction log archiving include this type of process flow.

STEP 710: The application program 14a writes a file to the volume 111.

STEP 715: The application program 14a checks if the volume 111 is full. If the volume 111 is full, the operation proceeds to step 720, otherwise, it returns to step 710.

STEP 720: The application program 14a issues a migration request to the migration program 18a. The migration program 18a migrates all files in the volume 111 to another volume XXX. In this embodiment, volume XXX is used as following order; XXX=113, 114, 121, 122, 123, 124, 131, 132, 133, 144.

STEP 730: The application program 14a writes a file to the volume 112.

STEP 735: The application program 14a checks whether the volume 112 is full. If the aforesaid volume is full, the operation proceeds to step 740, otherwise to step 730.

STEP 740: The application program 14a issues a migration request to the migration program 18a. The migration program 18a migrates all files in the volume 111 to another volume XXX. Return to step 710.

Figure 9:
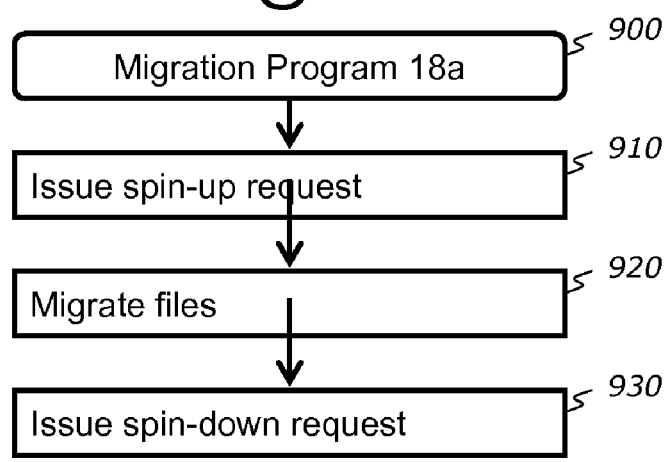
FIG. 9 illustrates exemplary process flow for a data migration program.

The Migration Program 18a will now be described in details. An exemplary process flow for migration program 18a is shown in FIG. 9. A migration request with a source volume number and a destination target number is issued from the application program 14a in the host computer 10a.

STEP 910: The migration program 18a issues a spin-up request to the top tier storage apparatus via data network 50 and wait until a success status is returned.

STEP 920: The migration program 18a migrates all files in the source volume to the destination volume.

STEP 930: The migration program 18a issues a spin-down request to the top tier storage apparatus via data network 50 and wait until a success status is returned.

Figure 10:
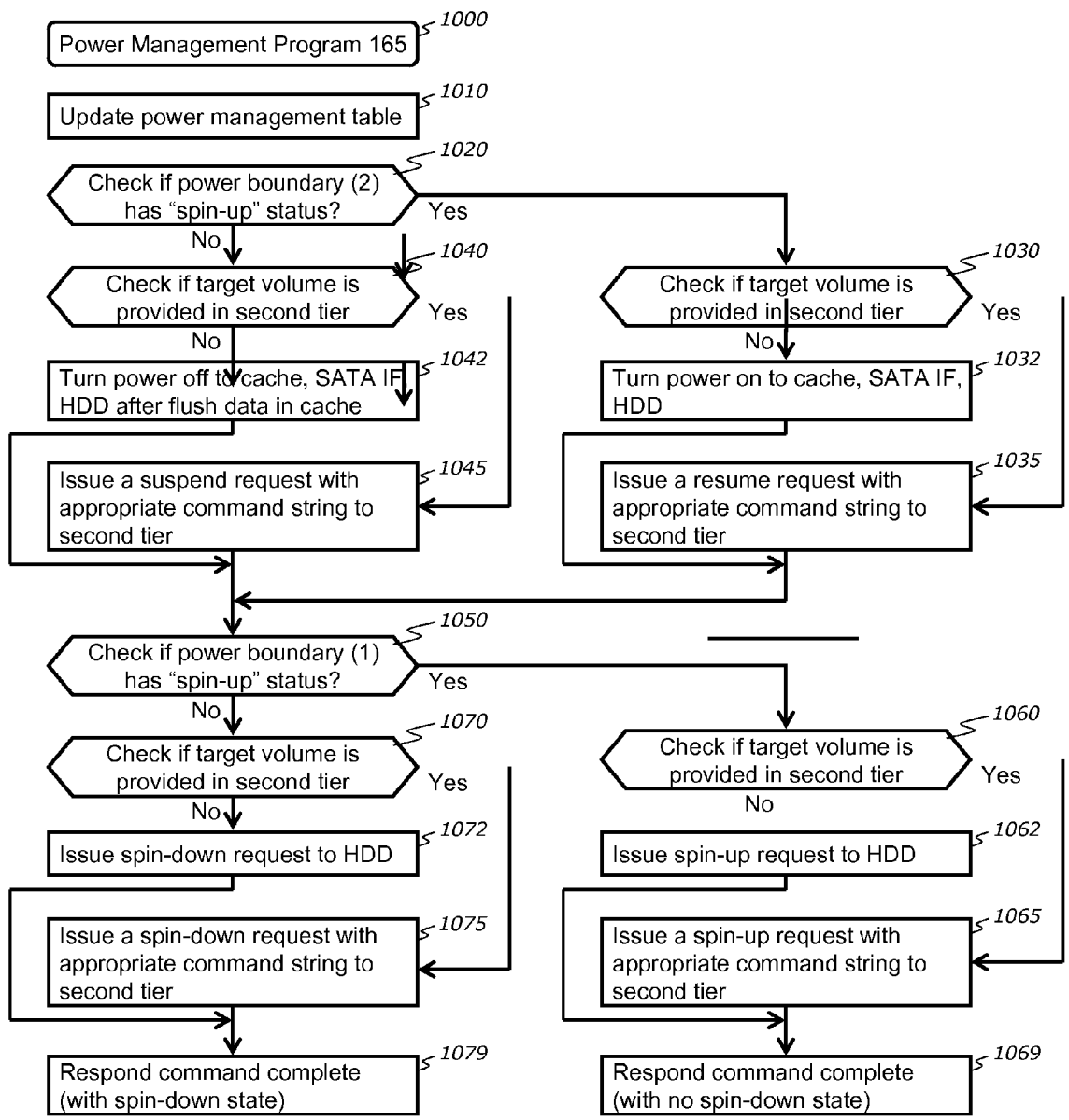
FIG. 10 illustrates exemplary process flow for the power management program.
Figure 11:
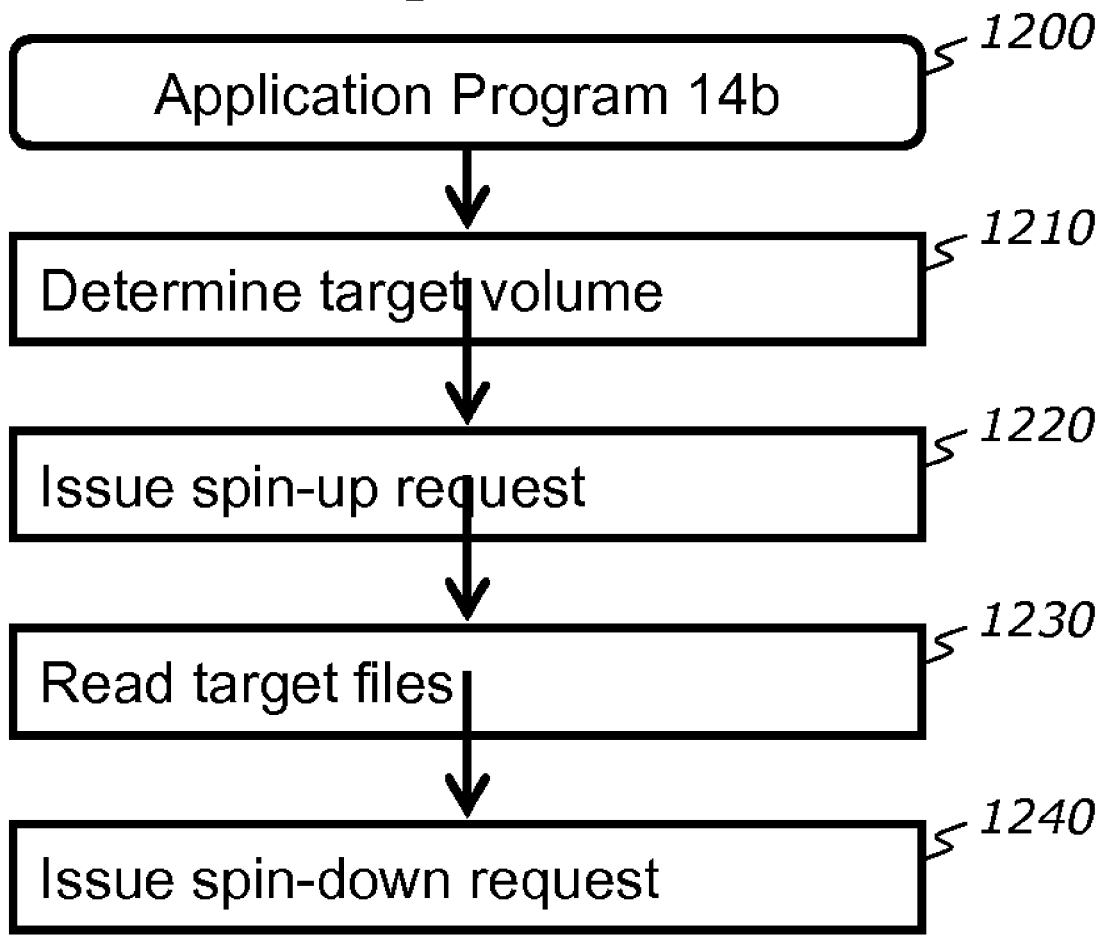
FIG. 11 illustrates exemplary power management table.

A Power Management Program 165 with "Self Spin-down Capability" will now be described in detail. FIG. 10 shows an exemplary process flow for the power management program 165. FIG. 11 shows an exemplary power management table 167. This table is created from the power boundary information gathered from the second tier storage appliances 200 and 300; the power boundary information in the top tier storage apparatus 100 itself and the volume to volume map table in the top storage apparatus 100. Spin-down/up status is kept in independent cell corresponding to the host computer. The power management program 165 receives spin-down request and spin-up request with target volume number and the host computer number.

STEP 1010: The power management program 165 updates the "spin down/up status" cell corresponding to the target volume number and the host computer number. "down" or "up" is filled in the cell.

STEP 1020: The power management program 165 checks whether the power boundary (2), which includes the target volume, has "spin-up" status. If yes, the operation proceeds to step 1030, otherwise to step 1040.

STEP 1030: The power management program 165 checks if the target volume is provided by the second tier storage apparatus. If yes, the operation proceeds to step 1035 (volume is in the second tier storage apparatus), otherwise to step 1032 (volume is in the top tier storage apparatus).

STEP 1032: The power management program 165 turns power on to the cache, SATA IF and HDD. (In this embodiment, the top tier storage apparatus does not have the power boundary (2). Consequently, there are no opportunities to execute the step 1032.)

STEP 1035: The power management program 165 issues a resume request by an appropriate command string to the second tier storage apparatus. The resume request may have the following format: "resume XXXXX", wherein the XXXXX designates the power boundary number in the second tier storage apparatus 300.

STEP 1040: The power management program 165 checks whether the target volume is provided by the second tier storage apparatus. If yes, the operation proceeds to step 1045

(volume is in the second tier storage apparatus), otherwise, the operation proceeds to step 1042 (volume is in the top tier storage apparatus).

STEP 1042: The power management program 165 turns power off to the cache, SATA IF and HDD after flushing data in the cache to the persistent storage. (In this embodiment, the top tier storage apparatus does not have the power boundary (2). So there are no opportunities to execute step 1042.)

STEP 1045: The power management program 165 issues a suspend request by an appropriate command string to the second tier storage apparatus. In this embodiment, the suspend request may have the following format: "suspend XXXXX", wherein XXXXX designates a power boundary number to the second tier storage apparatus 300.

STEP 1050: The power management program 165 checks if the power boundary (1), which includes the target volume, has "spin-up" status. If yes, the operation proceeds to step 1060, otherwise, the operation proceeds to step 1070.

STEP 1060: The power management program 165 checks if the target volume is provided by the second tier storage apparatus. If yes, the operation proceeds to step 1065 (volume is in the second tier storage apparatus). Otherwise, the operation proceeds to step 1062 (volume is in the top tier storage apparatus).

STEP 1062: The power management program 165 issues five spin-up requests to each HDD corresponding to the power boundary. To this end, the power management program 165 refers to the power boundary information shown in FIG. 5 (*a*). before proceeding further, the power management program waits until receiving command complete from all HDD. If the power management program 165 has information that all of the HDD has already been spin-upped, spin-up requests may not be issued.

STEP 1065: The power management program 165 issues a spin-up request by an appropriate command string to the second tier storage apparatus. In this embodiment, the spin-up request may have the following format: "su -pb XXXXX", wherein XXXXX designates a power boundary number to the second tier storage apparatus 200. A request "up XXXXX" is used with power boundary number to the second tier storage apparatus 300. Before proceeding any further, the power management program 165 waits until receiving a command complete from the second tier storage apparatus.

STEP 1069: The power management program 165 responds with a command complete to the host computer 10. In this step, a command complete with no spin-down state may be reported.

STEP 1070: The power management program 165 checks if the target volume is being provided by the second tier storage apparatus. If so, the operation proceeds to step 1075 (volume is in the second tier storage apparatus). Otherwise, the operation proceeds to step 1072 (volume is in the top tier storage apparatus).

STEP 1072: The power management program 165 issues five spin-down requests to each HDD corresponding to the power boundary. To this end, the power management program 165 refers to the power boundary information shown in FIG. 5 (*a*). Before proceeding any further, the power management program 165 waits until receiving command complete acknowledgments from all the affected HDDs.

STEP 1075: The power management program 165 issues a spin-down request using an appropriate command string to the second tier storage apparatus. In this embodiment, the spin-down request may be formatted as "sd -pb XXXXX", wherein XXXXX designates a power boundary number to the second tier storage apparatus 200. In addition, a request having a format "down XXXXX" may be used with power boundary number XXXXX in conjunction with the second tier storage apparatus 300. Before proceeding further, the power management program 165 waits until receiving a command complete acknowledgment from the second tier storage apparatus.

STEP 1079: The power management program 165 responds with a command complete acknowledgment to the host computer 10. In one implementation, a command complete acknowledgment with spin-down state may be reported.

As mentioned above, appropriate power boundary including the second tier storage apparatuses is entered spin-down and/or suspend although the host computers only issue spin-down/up request with target volume number to the top tier storage apparatus. The host computer need not be provided with information on the power boundary in the top tier storage apparatus and the second tier storage apparatus. An appropriate command string is issued to the second tier storage apparatus according to the power boundary information gathered at the system initialization phase.

Figure 12:
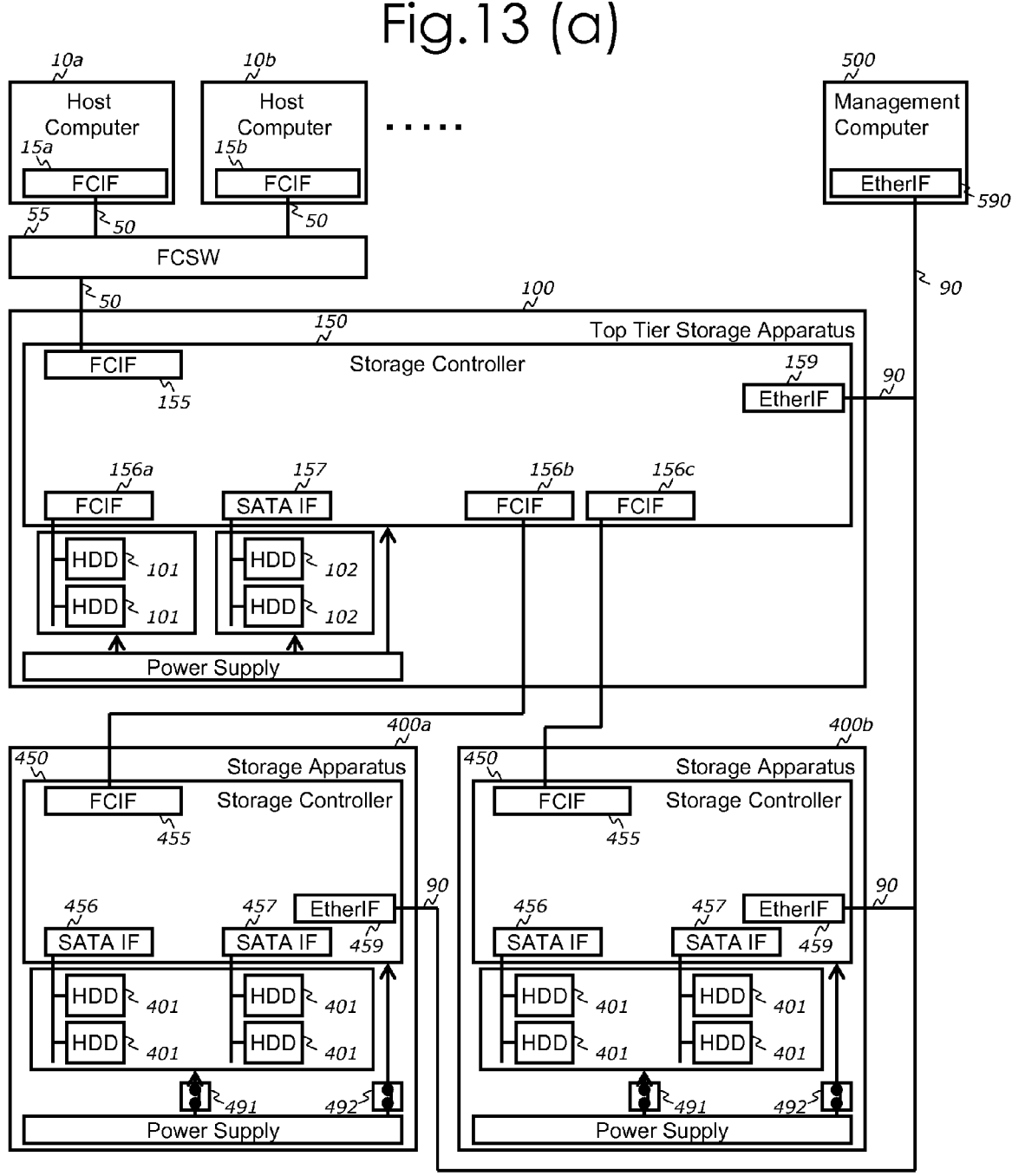
FIG. 12 illustrates exemplary process flow for the application program in the host computer.

The operation of the Host Computer 10*b* will now be described in detail. FIG. 12 shows process flow for the application program 14*b* in the host computer 10*b*. The host computer 10*b* is used for retrieving old files from the data volumes. This type of process flow is common in computer systems. For examples, restoring destroyed files and referring old mails/transaction include this type of process flow. The application program 14*b* in the host computer 10*b* receives a file retrieve request with a target file name at least. In one implementation of the invention, the host computer 10*b* may incorporate database for holding relationship between file name and volume number. Also the data base may be stored in the storage apparatus.

STEP 1210: The application program 14*b* determines a target volume, which includes the target file identified by the file name.

STEP 1220: The application program 14*b* issues the spin-up request to the target volume.

STEP 1230: The application program 14*b* read a target files from the target volume.

STEP 1240: The application program 14*b* issues the spin-down request to the target volume.

In the top tier storage apparatus 100, the process flow 1000 shown in FIG. 10 works for this behavior. The target volume is spin-upped even if the target volume is provided in the second tier storage apparatus by an appropriate command string. The host computer 10 does not need to know the each appropriate command string for each storage apparatus, power boundary and volume to volume map in the top tier storage apparatus 100. Especially, this system configuration is effective in the case of multiple host computer configuration (plural application 14*b* which issues spin-down request is executed on plural host computer). The application 14*b* does not need to know that status of other application volume usage. Spin-down is prevented if the other host computer is spin-upping the volume.

In this embodiment, the power management table shown in FIG. 11 keeps the spin-down/up status in independent cell corresponding to the host computer. In this embodiment, WWN (World Wide Name) given to the FibreIF is used. Mac address or IP address should be used in the case of the data network is Ethernet.

Another implementation, the spin-down/up status may be kept in independent cell corresponding to the application. Applications should be identified by unique number in the system.

Another implementation, the spin-down/up status may be kept as spin-up counter corresponding to each volume. The spin-up counter is increased when the power management program 165 receives a spin-up request. The spin-up counter is decreased when the power management program 165 receives a spin-down request. The power management program 165 issues spin-up command to the HDD or the second tier storage apparatus when the spin-up counter becomes to one, and the power management program 165 issues spin-down command to the HDD or the second tier storage apparatus when the spin-up counter returns to zero. FIG. 21 shows the power management table for this case. The power management program may provide a mean for reset the spin-up counter. In the case of host computer failures, the management computer 500 can reset the spin counter via the mean.

Figure 20:
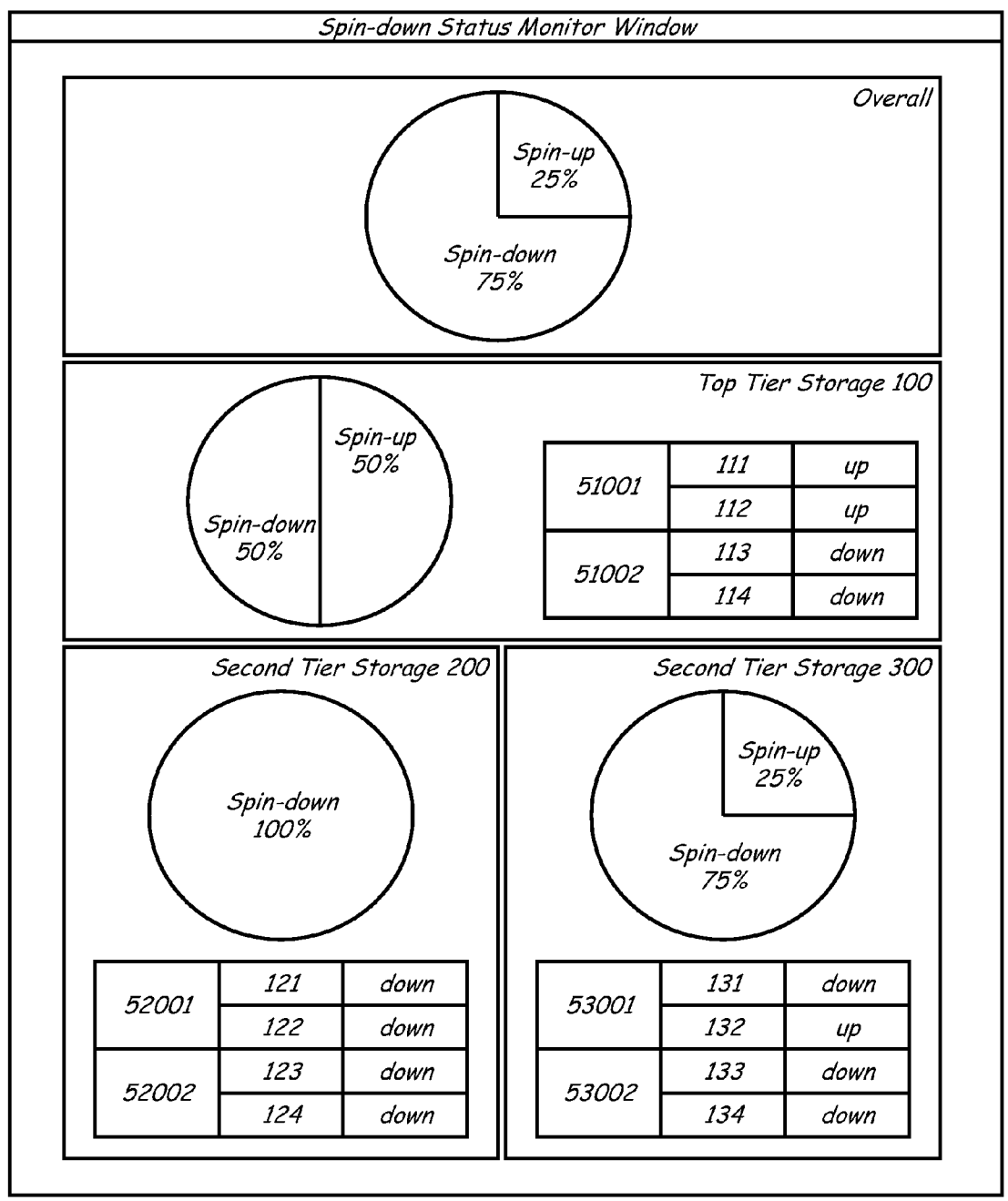
FIG. 20 illustrates an exemplary user interface display image reflecting spin-down status information in the storage system.

Spin-Down Status Monitoring Program 521:

The spin-down status monitoring program 521 may check spin-down status in the storage apparatuses. The spin-down status monitoring program 521 gathers the spin-down statuses from the spin-down status reporting program 164, 264 and 364 periodically. Example of the spin-down status is shown in FIG. 19. The management computer may display the spin-down status on the display device. Example of the display image is shown in FIG. 20. Administrators can know what percentage of the volumes is now spin-down and spin-up and how many volumes are spin-down and spin-up in each power boundary.

Variation:

In this embodiment, files in the volume are migrated by the migration program 18*a* in the host computer 10*a* according to the request from the application program 14*a*. The top tier storage apparatus 100 may migrate volume. In this case, the application program 14*a* issues a migration request to the top tier storage apparatus 100 and the migration and exchange program 166 is executed. All blocks in source volume is migrated to target volume.

2$^{nd}$ Embodiment

Figure 13:
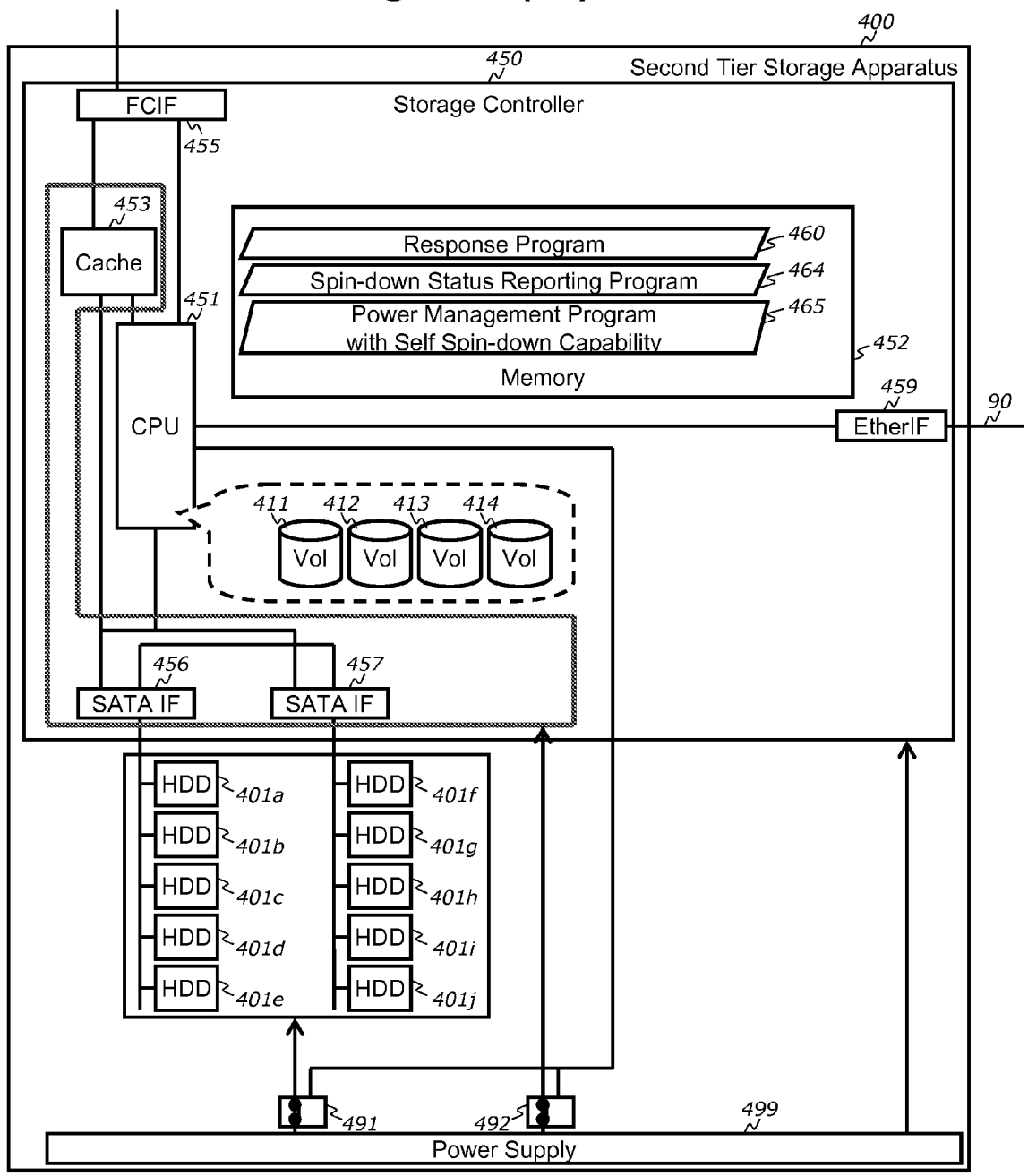
FIG. 13 (a) illustrates a general overview of another exemplary embodiment of an information system in which the one or more of the methods of the inventive concept may be applied.

System Configuration:

FIG. 13 shows an example of the information system overview in which the method of this invention applied. System configuration is similar to shown in FIG. 1. Differences between first embodiment and second embodiment are the following. The second tier storage apparatus 400 shown in FIG. 13 is used instead of the second tier storage apparatuses 200 and 300 shown in FIG. 1(*a*). The second tier storage apparatus 400 has "self spin-down" capability, which is the same as the corresponding capability of the top tier storage apparatus 100. The top tier storage apparatus does not maintain the power boundary information and does not execute the control command format gathering program 162, EtherIF 158.

The storage apparatus 400 will now be described in detail. The storage apparatus 400 may incorporate one or more HDDs 401 for storing data. HDDs 401 are configured to accept spin-down and spin-up request. The storage apparatus 400 may further incorporate one or more storage controllers 450 for providing data volumes to the host computers and a switch 491 for controlling electric power supply to HDD. This switch 491 is controlled by the CPU 451. The storage apparatus 400 may further incorporate a switch 492 for controlling electric power supply to cache 453 and SATA IF 457 as well as one or more power supplies 499 for supplying electric power to the HDDs and the storage controller 450.

The storage controller 450 may incorporate a CPU 451 for executing programs stored in a memory 452; the memory 452 for storing programs and data; a cache 453 for storing data received from the top tier storage apparatus and read from the HDD; a FCIF 455 for connecting to the top tier storage apparatus 100; a SATA IF 456 and 457 for connecting to the HDD 401 (if HDD has another interface such as SCSI, SAS, appropriate interface should be implemented.); an EtherIF 459 for connecting to the management network 90 and at least three programs stored in the memory 452 and executed by the CPU 451.

In this embodiment, the memory 452 may store at least: a response program 460 for responding to READ/WRITE command from the top tier storage apparatus 100; a spin-down status reporting program 464 for reporting current spin-down status and other power supply status to the management computer 500; a power management program 465 for managing HDDs' spin down, spin-up and power supply according to the request from the top tier storage apparatus; and a power management program 465 with "self spin-down capability":

An exemplary process flow shown in FIG. 10 can be used in the implementation of the power management program 465. The second tier storage apparatuses in this embodiment may not have extra connections to the storage apparatus (third tier storage apparatus). For this reason, there are no need to execute steps 1035, 1045, 1065 and 1075 of the process flow shown in FIG. 10.

Power Management Program 165 in the Second Embodiment:

In this embodiment, the power management table shown in FIG. 14 is utilized. The power management program 165 is not required to gather the power boundary and command for spin-down/up and suspend/resume. A spin-down/up request from the host computer is forwarded to the appropriate second tier storage apparatus if the target volume is provided by the second tier storage apparatus.

Figure 15:
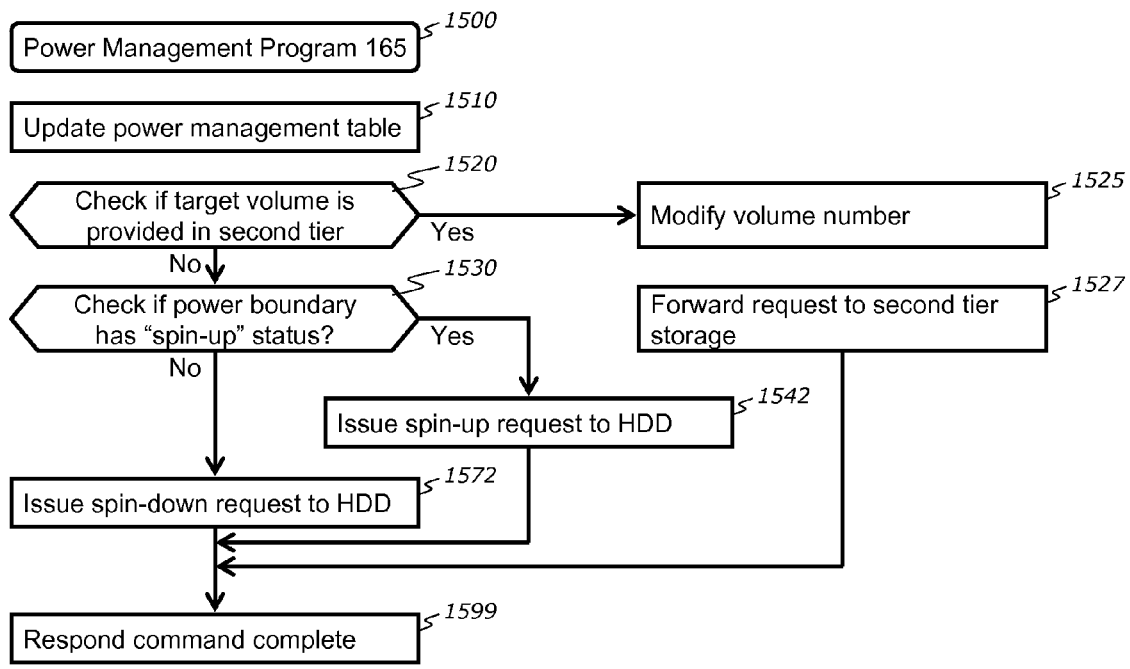
FIG. 15 illustrates an exemplary process flow for the power management program in this embodiment.

FIG. 15 illustrates exemplary process flow for the power management program 165 in this embodiment.

STEP 1510: The power management program 165 updates the "spin down/up status" cell corresponding to the target volume number and the host computer number. At this step, appropriate "down" or "up" values are filled in the corresponding cell.

STEP 1520: The power management program 165 checks if the target volume is being provided by the second tier storage apparatus. If yes, the operation proceeds to step 1525 (volume is in the second tier storage apparatus). Otherwise, the operation proceeds to step 1530 (volume is in the top tier storage apparatus).

STEP 1525: The power management program 165 modifies the volume number according to the volume to volume map (shown in FIG. 18 (*a*)) in the top tier storage apparatus. (For example, target volume is 122, volume number is modified to 412*a*.)

STEP 1527: The power management program 165 forwards the spin-down/up request to the appropriate second tier storage apparatus.

STEP 1530: The power management program 165 checks whether the power boundary, which includes the target volume, has a "spin-up" status. If yes, the operation proceeds to step 1542. Otherwise, the operation proceeds to step 1572.

STEP 1542: The power management program 165 issues five spin-up requests to each HDD corresponding to the power boundary. The power management program 165 refers the power boundary information shown in FIG. 5 (*a*). The power management program waits until receiving command complete from all HDD. If the power management program 165 has already known the spin-down/up status and HDD has already spin-upped, spin-up requests may not be issued.

STEP 1572: The power management program 165 issues five spin-down requests to each HDD corresponding to the power boundary. The power management program 165 refers the power boundary information shown in FIG. 5 (a). The power management program 165 waits until receiving command completes from all HDD.

STEP 1599: The power management program 165 responds a command complete to the host computer 10.

Data Migration Between Second Tier Storage Apparatuses

Figure 16:
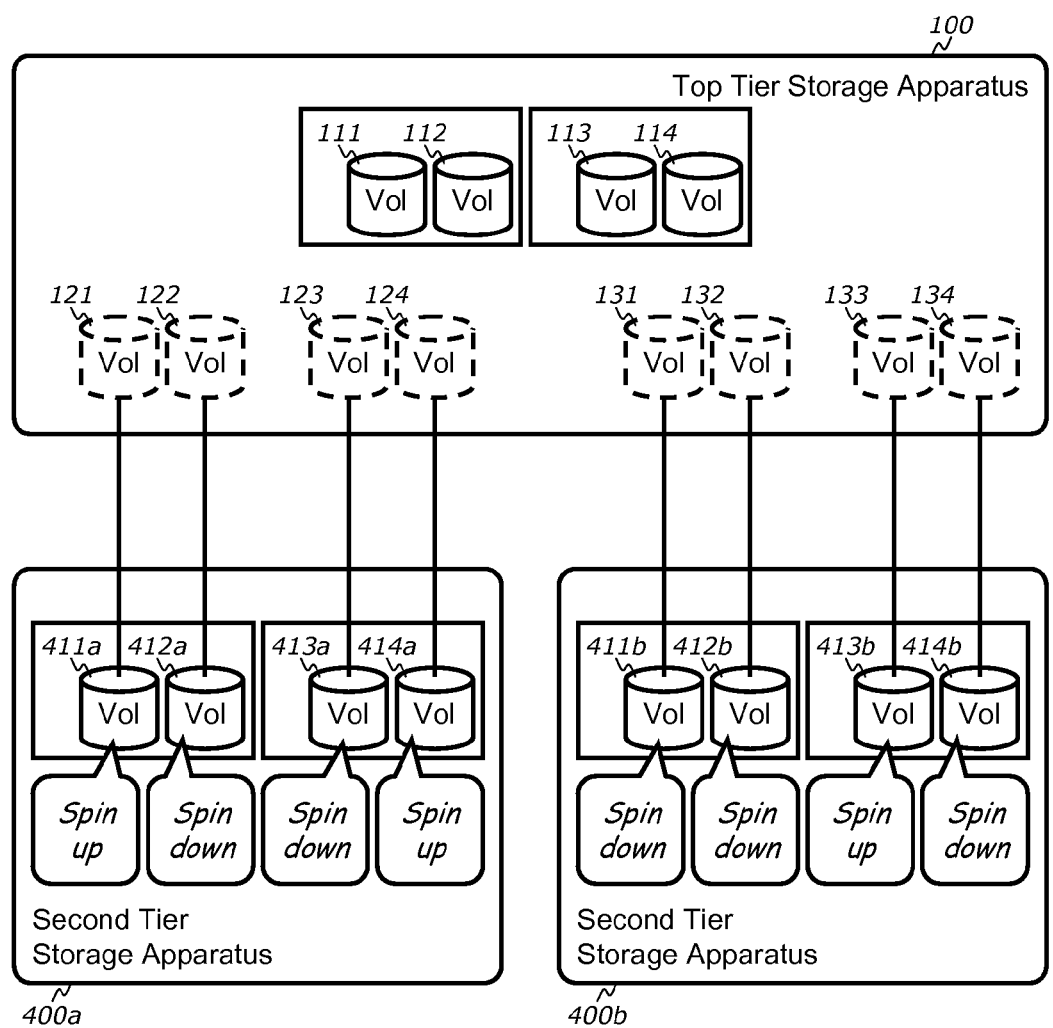
FIG. 16 (a) illustrates an exemplary implementation of a top tier storage apparatus in this embodiment.
Figure 16:
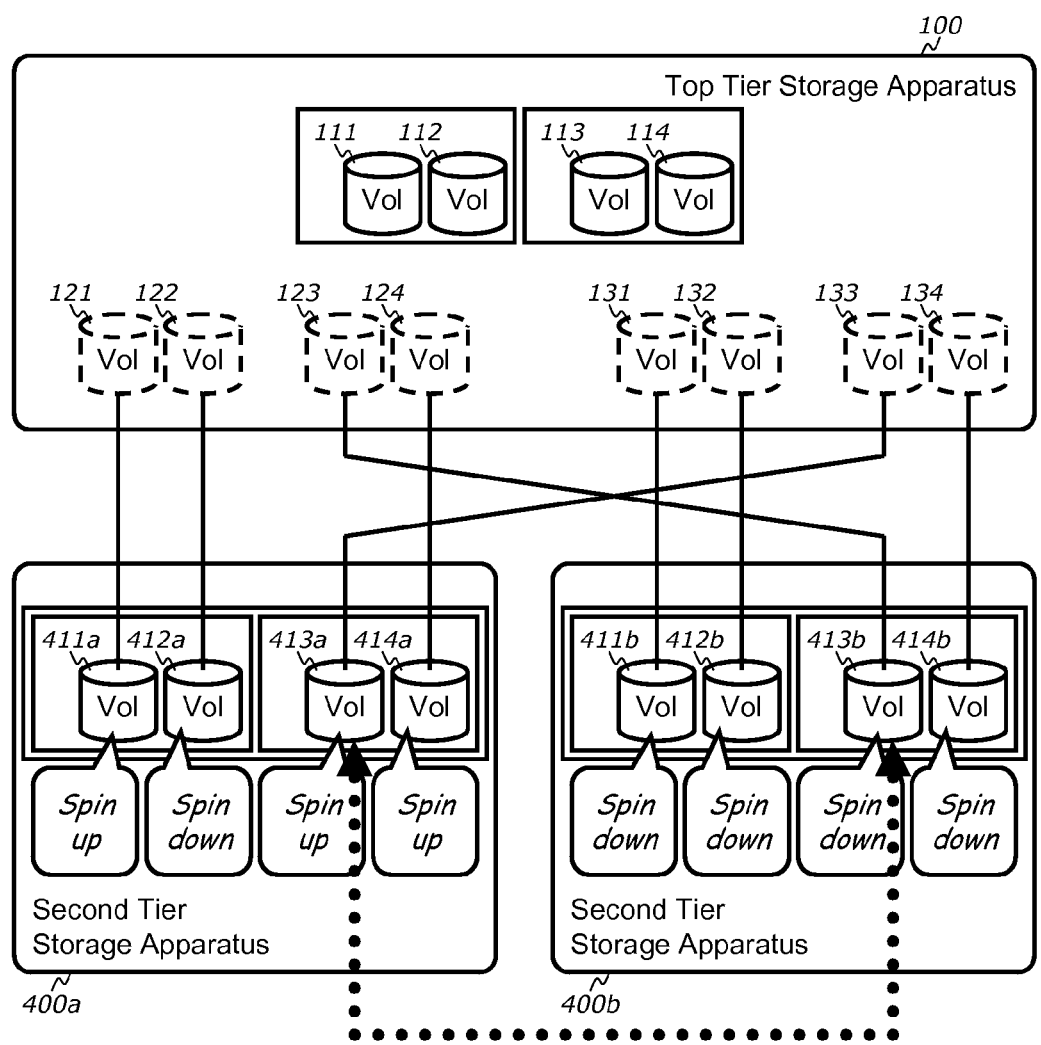

Data migration between the second tier storage apparatuses as a result of spin-down status monitored by the spin-down status monitoring program 521 will now be described in detail. In the configuration illustrated in FIG. 16 (a), volumes 121, 124 and 133 are spin-upped for an extended period of time. The spin-down monitoring program 521 gathers the spin-down status from the spin-down status reporting program in the second tier storage apparatuses. Two spin-down states are reported from the second tier storage apparatus 400a and 400b shown in FIG. 17.

The spin-down status monitoring program 521 recognizes that only one volume 413b is in the spin-up state in the second tier storage apparatus 400b and power reduction effect is 500 Watt, if the volume 413b can be spin-down. The spin-down status monitoring program 521 issues a volume exchange request to the migration and exchange program 166. The migration and exchange program 166 migrates the data from the first volume to the second volume. In this case, the spin-down status monitoring program 521 issues a volume exchange request between the volume 413b and the volume 413a. Thereafter, the migration and exchange program 166 updates the volume-to-volume map 169 shown in FIG. 18 (b). The volume-to-volume map state shown in FIG. 16 (b) corresponds to the state after the aforesaid volume exchange has been performed.

As mentioned above, the host computers do not need to have information on the volume exchanges in the storage systems. The host computers can issue their own spin-down requests and spin-up requests to the volumes. The requests are forwarded to the appropriate second tier storage apparatus if the target volume is provided in the second tier storage apparatus. This is done using a volume-to-volume map table maintained and updated by the top tier storage apparatus 100.

In yet another exemplary implementation, the first embodiment and the second embodiment can be combined. In this combination, the top tier storage apparatus 100 forwards spin-down/up request to the second tier storage apparatus in the case of the second tier storage apparatus has "self spin-down" capability, and the top tier storage apparatus 100 issues an appropriate command string to the storage apparatus in the case of the second tier storage does not have "self spin-down" capability. To identify the "self spin-down" capability, the storage apparatus may have reporting program for the "self spin-down" capability and the top tier storage apparatus may run a gathering program for gathering the "self spin-down" capability at each second tier storage apparatus.

Exemplary Computer Architecture

Figure 22:
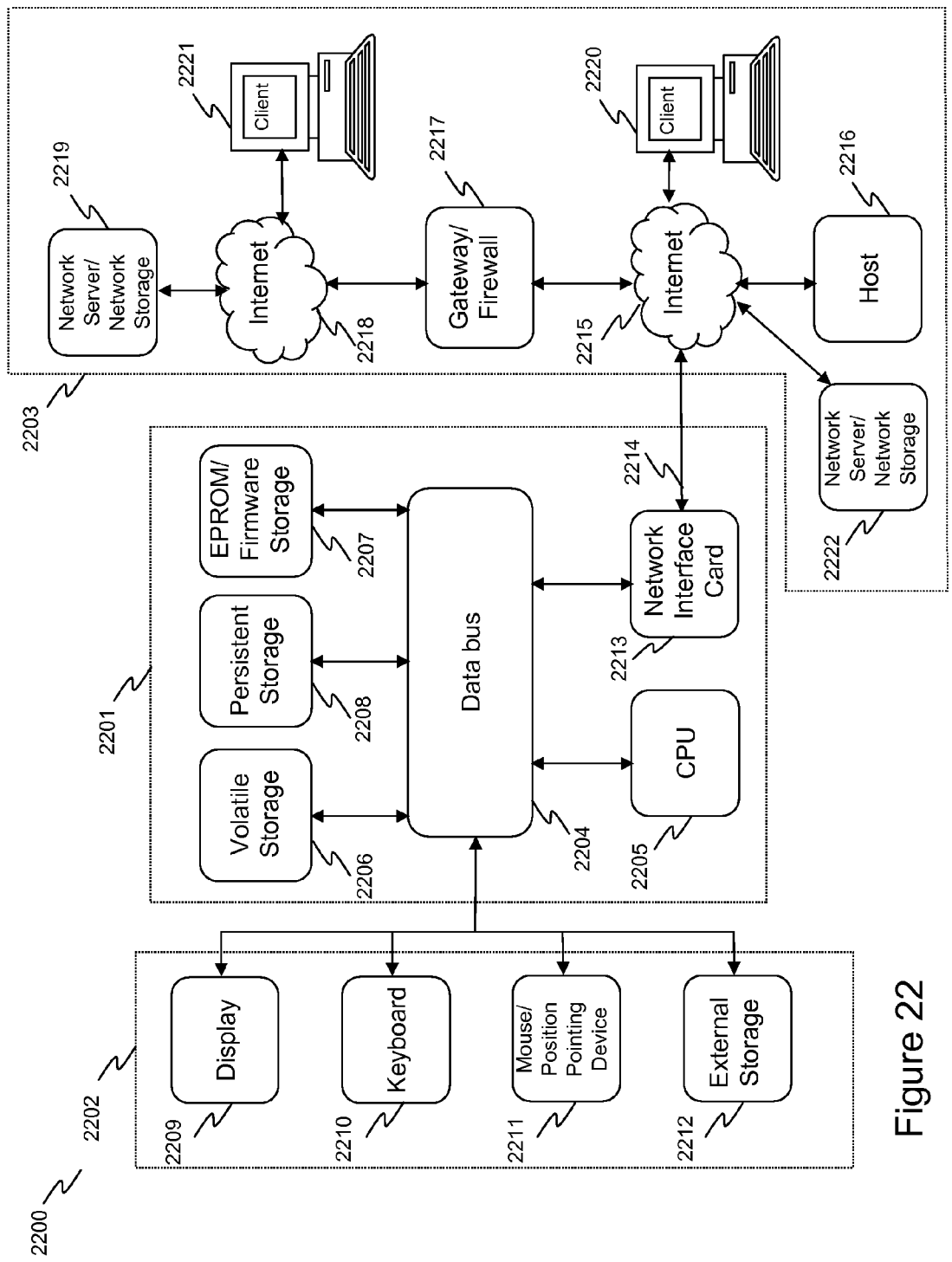
FIG. 22 illustrates an exemplary embodiment of a computer platform upon which the inventive system may be implemented.

FIG. 22 is a block diagram that illustrates an embodiment of a computer/server system 2200 upon which an embodiment of the inventive methodology may be implemented. The system 2200 includes a computer/server platform 2201, peripheral devices 2202 and network resources 2203.

The computer platform 2201 may include a data bus 2204 or other communication mechanism for communicating information across and among various parts of the computer platform 2201, and a processor 2205 coupled with bus 2201 for processing information and performing other computational and control tasks. Computer platform 2201 also includes a volatile storage 2206, such as a random access memory (RAM) or other dynamic storage device, coupled to bus 2204 for storing various information as well as instructions to be executed by processor 2205. The volatile storage 2206 also may be used for storing temporary variables or other intermediate information during execution of instructions by processor 2205. Computer platform 2201 may further include a read only memory (ROM or EPROM) 2207 or other static storage device coupled to bus 2204 for storing static information and instructions for processor 2205, such as basic input-output system (BIOS), as well as various system configuration parameters. A persistent storage device 2208, such as a magnetic disk, optical disk, or solid-state flash memory device is provided and coupled to bus 2201 for storing information and instructions.

Computer platform 2201 may be coupled via bus 2204 to a display 2209, such as a cathode ray tube (CRT), plasma display, or a liquid crystal display (LCD), for displaying information to a system administrator or user of the computer platform 2201. An input device 2210, including alphanumeric and other keys, is coupled to bus 2201 for communicating information and command selections to processor 2205. Another type of user input device is cursor control device 2211, such as a mouse, a trackball, or cursor direction keys for communicating direction information and command selections to processor 2204 and for controlling cursor movement on display 2209. This input device typically has two degrees of freedom in two axes, a first axis (e.g., x) and a second axis (e.g., y), that allows the device to specify positions in a plane.

An external storage device 2212 may be connected to the computer platform 2201 via bus 2204 to provide an extra or removable storage capacity for the computer platform 2201. In an embodiment of the computer system 2200, the external removable storage device 2212 may be used to facilitate exchange of data with other computer systems.

The invention is related to the use of computer system 2200 for implementing the techniques described herein. In an embodiment, the inventive system may reside on a machine such as computer platform 2201. According to one embodiment of the invention, the techniques described herein are performed by computer system 2200 in response to processor 2205 executing one or more sequences of one or more instructions contained in the volatile memory 2206. Such instructions may be read into volatile memory 2206 from another computer-readable medium, such as persistent storage device 2208. Execution of the sequences of instructions contained in the volatile memory 2206 causes processor 2205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 2208. Volatile media includes dynamic memory, such as volatile storage 2206. Transmission media includes coaxial cables, copper wire and fiber optics, including the wires that comprise data bus 2204.

Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2205 for execution. For example, the instructions may initially be carried on a magnetic disk from a remote computer. Alternatively, a remote computer can load the instructions into its dynamic memory and send the instructions over a telephone line using a modem. A modem local to computer system 2200 can receive the data on the telephone line and use an infra-red transmitter to convert the data to an infra-red signal. An infra-red detector can receive the data carried in the infra-red signal and appropriate circuitry can place the data on the data bus 2204. The bus 2204 carries the data to the volatile storage 2206, from which processor 2205 retrieves and executes the instructions. The instructions received by the volatile memory 2206 may optionally be stored on persistent storage device 2208 either before or after execution by processor 2205. The instructions may also be downloaded into the computer platform 2201 via Internet using a variety of network data communication protocols well known in the art.

The computer platform 2201 also includes a communication interface, such as network interface card 2213 coupled to the data bus 2204. Communication interface 2213 provides a two-way data communication coupling to a network link 2214 that is connected to a local network 2215. For example, communication interface 2213 may be an integrated services digital network (ISDN) card or a modem to provide a data communication connection to a corresponding type of telephone line. As another example, communication interface 2213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2213 sends and receives electrical, electromagnetic or optical signals that carry digital data streams representing various types of information.

Network link 2213 typically provides data communication through one or more networks to other network resources. For example, network link 2214 may provide a connection through local network 2215 to a host computer 2216, or a network storage/server 2217. Additionally or alternatively, the network link 2213 may connect through gateway/firewall 2217 to the wide-area or global network 2218, such as an Internet. Thus, the computer platform 2201 can access network resources located anywhere on the Internet 2218, such as a remote network storage/server 2219. On the other hand, the computer platform 2201 may also be accessed by clients located anywhere on the local area network 2215 and/or the Internet 2218. The network clients 2220 and 2221 may themselves be implemented based on the computer platform similar to the platform 2201.

Local network 2215 and the Internet 2218 both use electrical, electromagnetic or optical signals that carry digital data streams. The signals through the various networks and the signals on network link 2214 and through communication interface 2213, which carry the digital data to and from computer platform 2201, are exemplary forms of carrier waves transporting the information.

Computer platform 2201 can send messages and receive data, including program code, through the variety of network (s) including Internet 2218 and LAN 2215, network link 2214 and communication interface 2213. In the Internet example, when the system 2201 acts as a network server, it might transmit a requested code or data for an application program running on client(s) 2220 and/or 2221 through Internet 2218, gateway/firewall 2217, local area network 2215 and communication interface 2213. Similarly, it may receive code from other network resources.

The received code may be executed by processor 2205 as it is received, and/or stored in persistent or volatile storage devices 2208 and 2206, respectively, or other non-volatile storage for later execution. In this manner, computer system 2201 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with power saving functionality. It is intended that the specification and examples be considered as exemplary only, with a true scope and spirit of the invention being indicated by the following claims.

What is claimed is:

1. A computerized data storage system comprising:
   a top tier storage apparatus; and
   a second tier storage apparatus, connected to the top tier storage apparatus, the second tier storage apparatus comprising one or more hard disk drives operable to store data organized into one or more second tier logical volumes, wherein the top tier storage apparatus is operable to:
   map the one or more second tier logical volumes to one or more top tier logical volumes;
   create a map of a correspondence of the top tier logical volumes to the second tier logical volumes and power boundary information from the second tier storage apparatus; and
   identify whether the second tier storage apparatus has a self spin-down capability;
   wherein if the second tier storage apparatus does not have the self spin-down capability, send a command to instruct the second tier storage apparatus to spin down one or more of the hard disk drives of the second tier storage apparatus corresponding to one or more logical data volumes; and wherein if the second tier storage apparatus has the self-spin-down capability, the second tier storage apparatus checks if all volumes in a parity group have "spin-down" status, wherein if said all volumes in the parity group have the "spin-down" status, the second tier storage apparatus is operable to spin-down all HDDs in the parity group.

2. The computerized data storage system of claim 1, further comprising a management computer operatively coupled to the top tier storage apparatus and the second tier storage apparatus and operable to monitor spin-down status of the top tier logical data volumes and second tier logical data volumes and to display the spin-down status to a user.

3. The computerized data storage system of claim 1, wherein the power boundary information comprises at least one logical volume and at least one hard disk drive corresponding to the logical volume.

4. The computerized data storage system of claim 3, wherein the power boundary information further comprises a spin-up command or spin-down command corresponding to the at least one logical volume, the spin-up command or spin-down command operable to spin-up or spin-down hard disk drives corresponding to the at least one logical volume.

5. The computerized data storage system of claim 3, wherein the power boundary information further comprises a suspend command or a resume command operable to suspend or resume operation of the second tier storage apparatus corresponding to the at least one logical volume.

6. The computerized data storage system of claim 5, wherein the operation of the corresponding second tier storage apparatus is suspended or resumed by deactivating or activating a corresponding automatic power switch in response to the suspend command or the resume command.

7. The computerized data storage system of claim 1, wherein the top tier storage apparatus comprises a central processing unit operable to execute a power boundary management information for gathering power boundary information from the second tier storage apparatus.

8. The computerized data storage system of claim 1, wherein the top tier storage apparatus comprises a central processing unit operable to execute a power management program operable to:
   i. receive a spin-up or spin-down request and a target logical volume number;
   ii. check the corresponding power boundary information;
   iii. check whether the target logical volume is provided by a second tier storage apparatus;
   iv. if the target logical volume is provided by a second tier storage apparatus issue a spin-up or spin-down request to the second tier storage apparatus based on the power boundary information; and
   v. if the target logical volume is provided by a second tier storage apparatus issue a suspend or resume request to the second tier storage apparatus based on the power boundary information.

9. The computerized data storage system of claim 8, wherein the spin-up or spin-down request to the second tier storage apparatus comprises an HDD spin-up or spin-down request for each HDD in the target logical volume.

10. The computerized data storage system of claim 8, wherein the spin-up or spin-down request is received from the host computer.

11. The computerized data storage system of claim 1, wherein the second tier storage apparatus comprises a central processing unit operable to execute a status reporting program operable to report spin-up or spin-down status of hard disk drives in the second tier storage apparatus.

12. The computerized data storage system of claim 1, wherein the top tier storage apparatus further comprises one or more hard disk drives operable to store data organized into one or more top tier logical volumes provided by the top tier storage apparatus.

13. A computerized data storage system comprising:
   a second tier storage apparatus, the second tier storage apparatus comprising one or more hard disk drives operable to store data organized into one or more second tier logical volumes; and
   a top tier storage apparatus coupled to the second tier storage apparatus and a host computer, the top tier storage apparatus operable to:
   map the one or more second tier logical volumes to one or more top tier logical volumes;
   store spin-down and spin-up status of the one or more second tier logical data volumes; and
   identify whether the second tier storage apparatus has a self spin-down capability;
   wherein if the second tier storage apparatus does not have the self spin-down capability, send a command to instruct spin-down t to the second tier storage apparatus, and
   wherein if the second tier storage apparatus has the self spin-down capability, the second tier storage apparatus checks if all volumes in a parity group have "spin-down" status, in the case the all volumes in the parity group have the "spin-down" status, the second tier storage apparatus is operable to spin-down all HDDs in the parity group.

14. The computerized data storage system of claim 13, further comprising a second second tier storage apparatus, wherein the second tier storage apparatuses each comprises a central processing unit operable to execute a status reporting program operable to report spin-up or spin-down status of hard disk drives in the second tier storage apparatuses to a spin-down monitoring program executed by the top tier storage apparatus, and wherein the spin-down monitoring program is operable to determine that a migration of a logical volume from a second tier storage apparatus to the second second tier storage apparatus would result in a power saving and cause the logical volume to be migrated.

15. The computerized data storage system of claim 13, further comprising a management computer operatively coupled to the top tier storage apparatus and the second tier storage apparatus and operable to monitor spin-down status of the top tier logical data volumes and second tier logical data volumes and to display the spin-down status to a user.

16. The computerized data storage system of claim 13, wherein the top tier storage apparatus is operable to suspend or resume operation of the second tier storage apparatus by deactivating or activating a an automatic power switch.

17. A method performed in a computerized data storage system comprising a top tier storage apparatus and a second tier storage apparatus, connected to the top tier storage apparatus, the second tier storage apparatus comprising one or more hard disk drives operable to store data organized into one or more second tier logical data volumes, the method comprising:
   a. mapping the one or more second tier logical volumes to one or more top tier logical volumes
   b. creating a map of a correspondence of the top tier logical volumes to the second tier logical volumes and power boundary information from the second tier storage apparatus; and
   c. identifying whether the second tier storage apparatus has a self spin-down capability;

wherein if the second tier storage apparatus does not have the self spin-down capability, sending a command to instruct the second tier storage apparatus to spin down one or more of the hard disk drives of the second tier storage apparatus corresponding to one or more logical data volumes;

wherein if the second tier storage apparatus has the self spin-down capability, the second tier storage apparatus checks if all volumes in a parity group have "spin-down" status, in the case the all volumes in the parity group have the "spin-down" status, the second tier storage apparatus is operable to spin-down all HDDs in the parity group.

18. The method of claim 17, wherein the power boundary information comprises at least one logical volume and at least one hard disk drive corresponding to the logical volume.

19. The method of claim 18, wherein the power boundary information further comprises a spin-up command or spin-down command corresponding to the at least one logical volume, the spin-up command or spin-down command operable to spin-up or spin-down hard disk drives corresponding to the at least one logical volume.

20. The method of claim 18, wherein the power boundary information further comprises a suspend command or a resume command operable to suspend or resume operation of the second tier storage apparatus corresponding to the at least one logical volume.

21. The method of claim 17, further comprising:
   i. receiving a spin-up or spin-down request and a target logical volume number;
   ii. checking the corresponding power boundary information;
   iii. checking whether the target logical volume is provided by a second tier storage apparatus;
   iv. if the target logical volume is provided by a second tier storage apparatus issuing a spin-up or spin-down request to the second tier storage apparatus based on the power boundary information; and
   v. if the target logical volume is provided by a second tier storage apparatus issuing a suspend or resume request to the second tier storage apparatus based on the power boundary information.

22. The method of claim 21, wherein the spin-up or spin-down request to the second tier storage apparatus comprises an HDD spin-up or spin-down request for each HDD in the target logical volume.

23. The method of claim 21, wherein the spin-up or spin-down request is received from the host computer.

24. The method of claim 17, further comprising executing a status reporting program to report spin-up or spin-down status of hard disk drives in the second tier storage apparatus.

25. A method performed in a computerized data storage system comprising a second tier storage apparatus comprising one or more hard disk drives operable to store data organized into one or more second tier logical data volumes and a top tier storage apparatus coupled to a host computer and the second tier storage apparatus, the top tier storage apparatus operable to map the one or more second tier logical volumes to one or more top tier logical volumes, the method comprising:
   a. storing, at the top tier storage apparatus, a spin-down and spin-up status of the one or more second tier logical data volumes;
   b. identifying whether the second tier storage apparatus has a self spin-down capability;

wherein if the second tier storage apparatus does not have the self spin-down capability, sending a command to instruct spin-down to the second tier storage apparatus; and wherein if the second tier storage apparatus has the self spin-down capability, checking, at the second tier storage apparatus, if all volumes in a parity group have "spin-down" status and in the case the all volumes in the parity group have the "spin-down" status, spinning-down all HDDs in the parity group.

* * * * *